United States Patent
Fushimi et al.

[11] Patent Number: 6,072,409
[45] Date of Patent: Jun. 6, 2000

[54] METHOD AND APPARATUS FOR SEARCHING A ROUTE

[75] Inventors: Makoto Fushimi, Hirakata; Takeshi Yagyu, Osaka; Yoshiki Ueyama, Sakai, all of Japan

[73] Assignee: Matsushita Electric Industrial Co., Ltd., Osaka-fu, Japan

[21] Appl. No.: 09/014,588

[22] Filed: Jan. 28, 1998

[30] Foreign Application Priority Data

Jan. 29, 1997 [JP] Japan .................................. 9-014939

[51] Int. Cl.[7] .................................................. G08G 1/123
[52] U.S. Cl. .......................... 340/988; 340/990; 340/995; 701/117
[58] Field of Search .................................. 340/988, 990, 340/995; 73/178 R; 701/117, 200, 202, 209

[56] References Cited

U.S. PATENT DOCUMENTS

| | | | |
|---|---|---|---|
| 5,270,708 | 12/1993 | Kamishima | 701/117 |
| 5,475,598 | 12/1995 | Fushimi et al. | 340/995 |
| 5,502,640 | 3/1996 | Yagyu et al. | 340/988 |
| 5,513,110 | 4/1996 | Fujita et al. | 340/990 |
| 5,657,231 | 8/1997 | Nobe et al. | 340/990 |
| 5,675,492 | 10/1997 | Tsuyuki | 340/988 |

FOREIGN PATENT DOCUMENTS 62-82316  4/1987  Japan .
8-75491   3/1996  Japan .

Primary Examiner—Daniel J. Wu
Assistant Examiner—John Tweel, Jr.
Attorney, Agent, or Firm—Wenderoth, Lind & Ponack, L.L.P.

[57] ABSTRACT

In areas where composite intersection traffic regulation exits, nodes and links for use in the conventional network are separated into a plurality of nodes and links, respectively. For example, one node is separated into N1$a$ to N1$c$, and one link is separated into L1$a$ to L1$c$. Then, the whole road network is represented by separating the network into a road network (L1$a$, L2$a$, L3$a$, L4$a$, L5$a$, N1$a$, N2$a$) in view of entering links (L1$a$, L3$a$) which the composite intersection traffic regulation does not affect, and road networks α (L1$b$, L2$b$, L3$b$, L4$b$, N1$b$, N2$b$) and β (L1$c$, L2$c$, L3$c$, L5$c$, N1$c$, N2$c$) in view of entering links (L4$b$, L5$c$) which the composite intersection traffic regulation affects, and one-way traffic regulations are set on suitable links to allow for a representation of the composite intersection transfer regulation. Use of such map data enables selections which are compliant with the composite intersection traffic regulation without requiring a specific processing at the time of the search processing.

20 Claims, 14 Drawing Sheets

F I G. 1 2
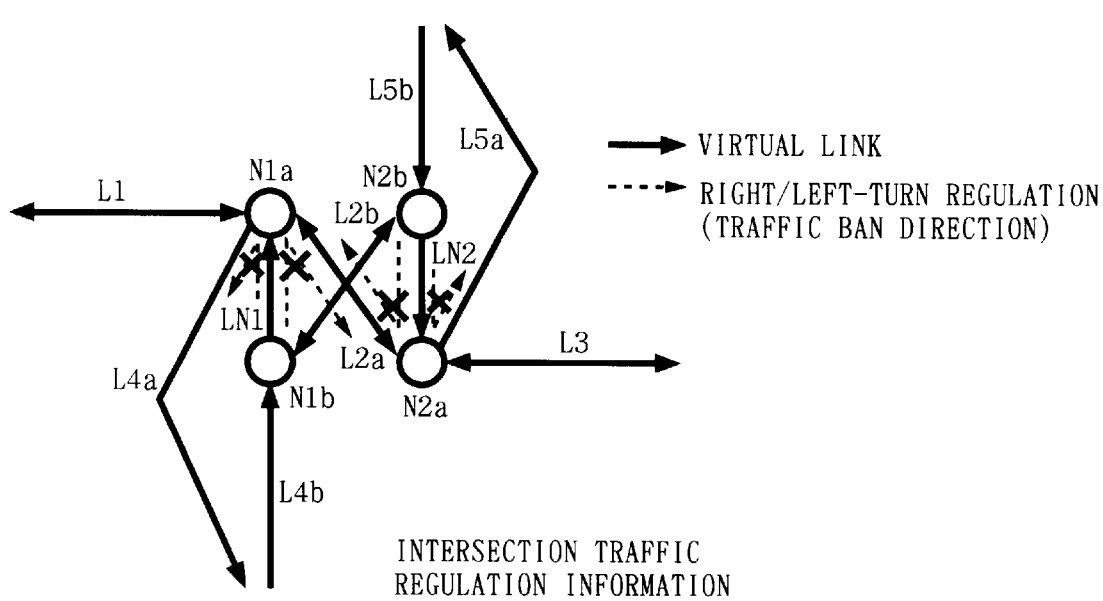
INTERSECTION TRAFFIC
REGULATION INFORMATION
| INTERSECTION | REGULATED DIRECTION |
|---|---|
| N1a | LN1 → L2a<br>LN1 → L4a |
| N2a | LN2 → L2a<br>LN2 → L5a |

A→B ONLY ROUTES SHOWN IN DOTTED
B→A LINES CANNOT BE PASSED

INTERSECTION TRAFFIC
REGULATION INFORMATION

| INTERSECTION | REGULATED DIRECTION |
|---|---|
| N1 | L2 → L4 |
| N2 | L2 → L5 |

INTERSECTION TRAFFIC
REGULATION INFORMATION

| INTERSECTION | REGULATED DIRECTION |
|---|---|
| NX1 | L4 → L5<br>L5 → L4 |

METHOD AND APPARATUS FOR SEARCHING A ROUTE

BACKGROUND OF THE INVENTION

1. Field of the Invention

The present invention relates to route selecting methods and apparatus and more particularly to a method and an apparatus for selecting the most suitable route between two arbitrary points on map data.

2. Description of the Background Art

As conventionally known, a car navigation system is a system for detecting and displaying a present point of a vehicle, automatically selecting for the most suitable route to a destination, and guiding the vehicle to the destination along the most suitable route by display guidance and/or audio guidance. In the car navigation system, a practical route which the vehicle can always pass through is required to guide the vehicle along the route. Therefore, route searching methods in which regulation information such as one-way traffic regulation and no-right/left-turn regulation is reflected have been considerably studied and suggested.

Conventionally, vehicle route guiding apparatus for selecting a route compliant with the traffic regulation using the steady regulation information as in the above include the one disclosed in Japanese Patent Laying-Open No. 62-82316, for example. In this document, the following method is shown as a method for reflecting the steady regulation information.

FIG. 21 is a diagram showing the structure of the conventional vehicle route guiding apparatus. In FIG. 21, the vehicle route guiding apparatus is composed of basic information storage means 22a for storing map data in which the next reachable adjacent intersection and a required time correlation amount for each intersection are written, considering traffic direction regulation such as do-not-enter and no-right/left-turn, and route searching means 22b for searching the minimum route from a starting intersection to a destination intersection under a certain condition referring to the map data which the basic information storage means 22a stores.

The above conventional method is characterized by a method of representing a road network of the map data recorded in the basic information storage means 22a. Only roads to the reachable intersections are stored in consideration of the traffic regulation, thereby allowing a search for a route compliant with the regulation without requiring a complicated processing by the route searching method 22b.

Here, described is an example of a representation of a road network of the conventional art. FIGS. 22(a) and 22(b) show an example of a representation of the road network (no-right/left-turn regulation). FIG. 22(a) shows an example of an intersection, and its road network is represented as in FIG. 22(b) when the no-right-turn regulation exists in each entering direction of the intersection in the above intersection. That is, a node is assumed for each entering direction of the intersection, and it is assumed that links exit only in passable straight-ahead/left-turn directions.

In this way, the conventional vehicle route guiding apparatus records the map data, using the road network on which the regulation information is reflected, to select a route which reflects the steady traffic regulation by applying the ordinary route search processing.

By the way, in the above-discussed conventional art, only the intersection traffic regulation in one intersection (right/left-turn regulation, for example) is an object to be represented. However, there exist complicated traffic regulations which cannot be represented only by the traffic regulation in one intersection. FIG. 23 shows an example of traffic regulation over a plurality of intersections which cannot be described by the conventional method (hereinafter referred to as composite intersection traffic regulation). In FIG. 23, it is presumed that only A→B and B←A are prohibited to be passed, and all of the others can be passed. FIG. 24 shows an example of representation of the composite intersection traffic regulation in FIG. 23 using the ordinary intersection traffic regulation on a general network. FIG. 24 represents the road network in FIG. 23 with two nodes (N1 and N2) and five links (L1 to L5). When the intersection traffic regulation shown as in FIG. 24 is applied, a passable route such as L1→N1→L2→N2→L5, for example, is disadvantageously not passable.

Therefore, in order to represent the above composite intersection traffic regulation, a method for unifying a plurality of intersections into one node (unified intersection method) is disclosed in Japanese Patent Laying-Open No. 8-75491. FIG. 25 shows an example of a unified intersection. Here, a node N1 and a node N2 are unified to be a new node NX1. The ordinary traffic regulation (no-straight-ahead regulation to L4→L5 and L5→L4) is written on the node NX1, thereby allowing representation of the regulation contents in FIG. 23.

When the conventional unified intersection method is used, in addition to the ordinary search processing, it is required to refer to cost information (time and distance) for passing through the unified intersection and route information in the unified intersection at the time of route display, thereby disadvantageously resulting in a complicated processing. Furthermore, when the cost in the unified intersection becomes large, the selected route is not necessarily the minimum cost route.

Here, described is an example of cases where the selected route is not the minimum cost route when the unified intersection method is used, using drawings. FIG. 26 is a diagram showing an example of a road network in a case where the selected route is not the minimum cost route when the conventional unified intersection method is used. FIG. 27 is a diagram representing the road network in FIG. 26 with the conventional unified intersection method. In FIG. 26, assume that the minimum cost route from a starting direction to a node N4 is L1→N1→L4→N3→L7→N4 and the minimum cost route to a node N5 is L1→N1→L2→N2→L5→N5. In this case, the minimum cost route from the starting direction to the destination direction is L1→N1→L2→N2→L5→N5→L9. However, when the nodes N4 and N5 are unified in this road network into a unified node NX1 as shown in FIG. 27, the minimum cost route from the starting direction to the unified node NX1 is L1→N1→L4→N3→L7→NX1. Since searches expanse further on the basis of the results, the finally obtained route from the starting direction to the destination direction is L1→N1→L4→N3→L7→NX1→L9, which is different from the correct minimum cost route as shown in FIG. 26.

SUMMARY OF THE INVENTION

Accordingly, an object of the present invention is to provide a route searching method and an apparatus capable of providing the minimum cost route compliant with the complicated regulation information over a plurality of intersections as the most suitable route.

The present invention has the following features to achieve the object discussed above.

A first aspect of the present invention is directed to a method for selecting an optimum route between two arbitrary points on map data, comprising the steps of:

setting the two points to be searched for on the map data; and searching for the optimum route between the set two points based on the map data.

The map data including at least node data indicating intersections on a map as nodes and link data indicating roads on the map as links. The map data:

representing an area where composite intersection traffic regulation over a plurality of intersections exists by a road network composed of separate node data obtained by separating each intersection on the map into a plurality of nodes and separate link data obtained by separating each road on the map into a plurality of links; and further representing the composite intersection traffic regulation by setting one-way traffic regulations to the separate link data and/or setting right/left-turn traffic regulations to the separate node data.

A second aspect of the present invention is directed to a method for selecting an optimum route between two arbitrary points on map data, comprising the steps of:

setting the two points to be searched for on the map data; and searching for the optimum route between the set two points based on the map data.

The map data including at least node data indicating intersections on a map as nodes and link data indicating roads on the map as links. The map data:

representing an area where composite intersection traffic regulation over a plurality of intersections exists by a road network composed of separate node data obtained by separating each intersection on the map into a plurality of nodes, separate link data obtained by separating each road on the map into a plurality of links, and unified link data obtained by unifying part of the separate link data; and further representing the composite intersection traffic regulation by setting one-way traffic regulations to the separate link data and the unified link data and/or setting right/left-turn traffic regulations to the separate node data.

A third aspect of the present invention is directed to a method for selecting an optimum route between two arbitrary points on map data, comprising the steps of:

setting the two points to be searched for on the map data; and searching for the optimum route between the set two points based on the map data.

The map data including at least node data indicating intersections on a map as nodes and link data indicating roads on the map as links. The map data:

representing an area where composite intersection traffic regulation over a plurality of intersections exists by a road network composed of separate node data obtained by separating each intersection on the map into a plurality of nodes, separate link data obtained by separating each road on the map into a plurality of links, and virtual link data obtained by connecting nodes separated from one intersection by a virtual link; and further representing the composite intersection traffic regulation by setting one-way traffic regulations to the separate link data and the virtual link data and/or setting right/left-turn traffic regulations to the separate node data.

As described above, in accordance with the first to third aspects, it is possible to represent the composite intersection traffic regulation only with the network structure of the map data and select a route compliant with the composite intersection traffic regulation without specific processing at the time of search processing.

A fourth aspect of the present invention is directed to a method for selecting an optimum route between two arbitrary points on map data, the map data including at least node data indicating intersections on a map as nodes, link data indicating roads on the map as links, and composite intersection traffic regulation information indicating composite intersection traffic regulation over a plurality of intersections. The method comprising the steps of:

setting the two points to be searched for on the map data; and searching for the optimum route between the set two points based on the map data.

The step of searching for the optimum route, at the time of searching for the optimum route, judging whether or not it is possible to pass through to a next point from the composite intersection traffic regulation information and arrival route information to a point to be searched for, and terminating a search to the next point if it is impossible.

As described above, in accordance with the fourth aspect, at the time of searching for the optimum route, it is judged whether or not it is possible to pass through to a next point from the composite intersection traffic regulation information and arrival route information to a point to be searched for, to terminate the search to the next point if it is impossible, thereby allowing quick selecting of a route compliant with the composite intersection traffic regulation.

According to a fifth aspect of the present invention, in the fourth aspect, the map data records link information to be recorded as the composite intersection traffic regulation information with connection numbers of the links connecting to one node.

As described above, in accordance with the fifth aspect, since the number of links connectable to one node is generally limited, it is possible to specify the links with a small number of bits and compress the data size to be recorded.

According to a sixth aspect of the present invention, in the fourth aspect, the map data doubly records the composite intersection traffic regulation information having the same contents in a node or link on an entering side and in a node or link on an exit side, and the step of searching for the optimum route performs search processing from both of the two points set for a search on the map data.

As described above, in accordance with the sixth aspect, since the composite intersection traffic regulation with the same contents are doubly written in both of the exit side node or link and the entering side node or link, it is possible to refer to the regulation contents without going back to the exit side node or link for searching for the applicable composite intersection traffic regulation even at the time of the destination side search, thereby allowing search time savings.

According to a seventh aspect of the present invention, in the fourth aspect, a plurality of kinds of the composite intersection traffic regulation are previously expressed in patterns and different identifiers are set thereto respectively, and the map data records the composite intersection traffic regulation information of the composite intersection traffic regulation expressed in patterns with the identifiers.

As described above, in accordance with the seventh aspect, as to the typical composite intersection traffic regulation with a large number of regulations, by recording not all information but only the identifiers indicating kinds of regulation patterns, it is possible to compress the size of the data to be recorded.

An eighth aspect of the present invention is directed to an apparatus for selecting an optimum route between two arbitrary points on map data, comprising:

a map data storage portion for storing the map data;

a point setting portion for setting the two points to be searched for on the map data stored in the map data storage portion; and a route searching portion for searching for the optimum route between the two points set by the point setting portion based on the map data stored in the map data storage portion.

The map data including at least node data indicating intersections on a map as nodes and link data indicating roads on the map as links. The map data:

representing an area where composite intersection traffic regulation over a plurality of intersections exists by a road network composed of separate node data obtained by separating each intersection on the map into a plurality of nodes and separate link data obtained by separating each road on the map into a plurality of links; and further representing the composite intersection traffic regulation by setting one-way traffic regulations to the separate link data and/or setting right/left-turn traffic regulations to the separate node data.

A ninth aspect of the present invention is directed to an apparatus for selecting an optimum route between two arbitrary points on map data, comprising:

a map data storage portion for storing the map data;

a point setting portion for setting the two point to be searched for on the map data stored in the map data storage portion; and a route searching portion for searching for the optimum route between the two points set by the point setting portion based on the map data stored in the map data storage portion.

The map data including at least node data indicating intersections on a map as nodes and link data indicating roads on the map as links. The map data:

representing an area where composite intersection traffic regulation over a plurality of intersections exists by a road network composed of separate node data obtained by separating each intersection on the map into a plurality of nodes, separate link data obtained by separating each road on the map into a plurality of links, and unified link data obtained by unifying part of the separate link data; and further representing the composite intersection traffic regulation by setting one-way traffic regulations to the separate link data and the unified link data and/or setting right/left-turn traffic regulations to the separate node data.

A tenth aspect of the present invention is directed to an apparatus for selecting an optimum route between two arbitrary points on map data, comprising:

a map data storage portion for storing the map data;

a point setting portion for setting the two points to be searched for on the map data stored in the map data storage portion; and a route searching portion for searching for the optimum route between the two points set by the point setting portion based on the map data stored in the map data storage portion.

The map data including at least node data indicating intersections on a map as nodes and link data indicating roads on the map as links. The map data:

representing an area where composite intersection traffic regulation over a plurality of intersections exists by a road network composed of separate node data obtained by separating each intersection on the map into a plurality of nodes, separate link data obtained by separating each road on the map into a plurality of links, and virtual link data obtained by connecting nodes separated from one intersection by a virtual link; and further representing the composite intersection traffic regulation by setting one-way traffic regulations to the separate link data and the virtual link data and/or setting right/left-turn traffic regulations to the separate node data.

As described above, in accordance with the eighth to tenth aspects, it is possible to represent the composite intersection traffic regulation only with the network structure of the map data and select a route compliant with the composite intersection traffic regulation without specific processing at the time of search processing.

An eleventh aspect of the present invention is directed to an apparatus for selecting an optimum route between two arbitrary points on map data, comprising:

a map data storage portion for storing at least node data indicating intersections on a map as nodes, link data indicating roads on the map as links, and composite intersection traffic regulation information indicating composite intersection traffic regulation over a plurality of intersections;

a point setting portion for setting the two points to be searched for on the map data stored in the map data storage portion; and a route searching portion for searching for the optimum route between the two points set by the point setting portion based on the map data stored in the map data storage portion.

The route searching portion, at the time of searching for the optimum route, judging whether or not it is possible to pass through to a next point from the composite intersection traffic regulation information and arrival route information to a point to be searched for, and terminating a search to the next point if it is impossible.

Further, according to the eleventh aspect of the present invention, by recording the passage direction to be regulated (regulated direction) and the passage condition (regulating condition) for effecting the regulation in the intersection where the regulation is finally effective with the link number or the node number string, etc., judging whether it is possible to pass through to the next point from the composite intersection traffic regulation information and the arrival route information to the point to be searched at the time of the search processing, and not extending the search if impassable, it is possible to select the most suitable route compliant with the composite intersection traffic regulation with a relatively simple data map structure.

As described above, in accordance with the eleventh aspect, at the time of searching for the optimum route, it is judged whether or not it is possible to pass through to a next point from the composite intersection traffic regulation information and arrival route information to a point to be searched for, to terminate the search to the next point if it is impossible, allowing quick selection of a route compliant with the composite intersection traffic regulation.

A twelfth aspect of the present invention is directed to a recording medium for recording map data for use in a route search. The map data including at least node data indicating intersections on a map as nodes and link data indicating roads on the map as links. The map data:

representing an area where composite intersection traffic regulation over a plurality of intersections exists by a road network composed of separate node data obtained by separating each intersection on the map into a plurality of nodes and separate link data obtained by separating each road on the map into a plurality of links; and further representing the composite intersection traffic regulation by setting one-way traffic regulations to the separate link data and/or setting right/left-turn traffic regulations to the separate node data.

A thirteenth aspect of the present invention is directed to a recording medium for recording map data for use in a route search. The map data including at least node data indicating intersections on a map as nodes and link data indicating roads on the map as links. The map data:

representing an area where composite intersection traffic regulation over a plurality of intersections exists by a road network composed of separate node data obtained by separating each intersection on the map into a plurality of nodes, separate link data obtained by separating each road on the map into a plurality of links, and unified link data obtained by unifying part of the separate link data; and further representing the composite intersection traffic regulation by setting one-way traffic regulations to the separate link data and the unified link data and/or setting right/left-turn traffic regulations to the separate node data.

A fourteenth aspect of the present invention is directed to a recording medium for recording map data for use in a route search. The map data including at least node data indicating intersections on a map as nodes and link data indicating roads on the map as links. The map data:

representing an area where composite intersection traffic regulation over a plurality of intersections exists by a road network composed of separate node data obtained by separating each intersection on the map into a plurality of nodes, separate link data obtained by separating each road on the map into a plurality of links, and virtual link data obtained by connecting nodes separated from one intersection by a virtual link; and further representing the composite intersection traffic regulation by setting one-way traffic regulations to the separate link data and the virtual link data and/or setting right/left-turn traffic regulations to the separate node data.

As described above, in accordance with the twelfth to fourteenth aspects, it is possible to represent the composite intersection traffic regulation only with the network structure of the map data and select a route compliant with the composite intersection traffic regulation without specific processing at the time of search processing.

A fifteenth aspect of the present invention is directed to a recording medium for recording map data for use in a route search. The map data including at least node data indicating intersections on a map as nodes, link data indicating roads on the map as links, and composite intersection traffic regulation information indicating composite intersection traffic regulation over a plurality of intersections; and the map data recording link information to be recorded as the composite intersection traffic regulation information with connection numbers of the links connecting to one node.

As described above, in accordance with the fifteenth aspect, since the number of links connectable to one node is generally limited, it is possible to specify the links with a small number of bits and compress the data size to be recorded.

A sixteenth aspect of the present invention is directed to a recording medium for recording map data for use in a route search.

The map data including at least node data indicating intersections on a map as nodes, link data indicating roads on the map as links, and composite intersection traffic regulation information indicating composite intersection traffic regulation over a plurality of intersections; and the map data doubly recording the composite intersection traffic regulation information having the same contents in a node or link on an entering side and in a node or link on an exit side.

As described above, in accordance with the sixteenth aspect, since the composite intersection traffic regulation with the same contents are doubly written in both of the exit side node or link and the entering side node or link, it is possible to refer to the regulation contents without going back to the exit side node or link for searching for the applicable composite intersection traffic regulation even at the time of the destination side search, allowing search time savings.

A seventeenth aspect of the present invention is directed to a recording medium for recording map data for use in a route search. The map data including at least node data indicating intersections on a map as nodes, link data indicating roads on the map as links, and composite intersection traffic regulation information indicating composite intersection traffic regulation over a plurality of intersections;

a plurality of kinds of the composite intersection traffic regulation being previously expressed in patterns and different identifiers being set thereto; and the map data recording the composite intersection traffic regulation information of the composite intersection traffic regulation expressed in patterns with the identifiers.

As described above, in accordance with the seventeenth aspect, as to the typical composite intersection traffic regulation with a large number of regulations, by recording not all information but only the identifiers indicating kinds of regulation patterns, it is possible to compress the size of the data to be recorded.

These and other objects, features, aspects and advantages of the present invention will become more apparent from the following detailed description of the present invention when taken in conjunction with the accompanying drawings.

BRIEF DESCRIPTION OF THE DRAWINGS

FIG. 12 is a diagram showing a fifth example of a network structure representing the composite intersection traffic regulation shown in FIG. 23;

DESCRIPTION OF THE PREFERRED EMBODIMENTS

Figure 1:
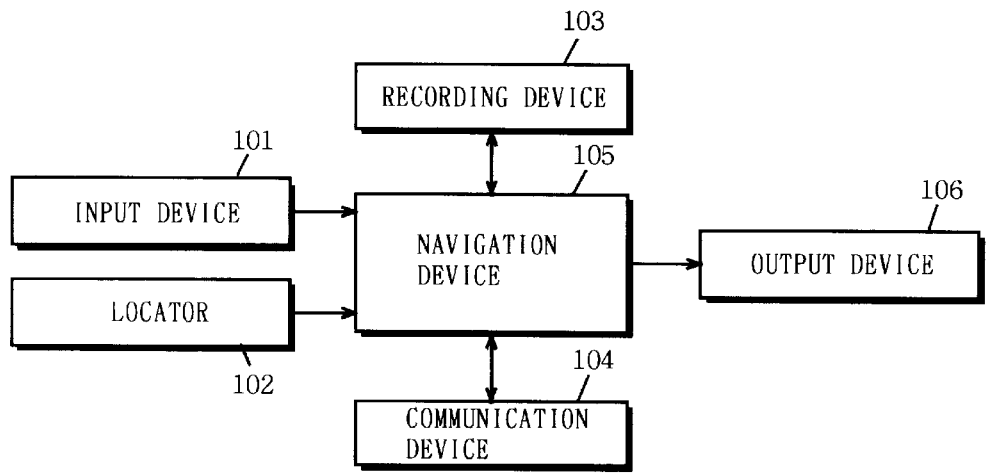
FIG. 1 is a block diagram showing the structure of a car navigation system according to an embodiment of the present invention.

FIG. 1 is a block diagram showing the structure of a car navigation system according to an embodiment of the present invention. In FIG. 1, the car navigation system of the present embodiment includes an input device 101, a locator 102, a recording device 103, a communication device 104, a navigation device 105, and an output device 106.

The input device 101 performs function selection (processing item change, map switching, hierarchical level change, etc.), point setting, search mode selection, etc. in the navigation system, by a remote controller, a touch sensor, a keyboard, a mouse, etc. The locator 102 is a GPS, a vehicle speed sensor, an angular speed sensor, an absolute azimuth sensor, etc., collecting various information for calculating the present position of a vehicle. The recording device 103 is an optical disk drive (CD, DVD, etc.), a hard disk, mass-storage memory, etc., storing information about a road network such as connecting situation, coordinates, configurations, attributes, regulation information of intersections and roads. The communication device 104 is composed of various radio communication devices such as an FM multiplex communication device/optical radio wave beacon device, transmitting and receiving various information such as traffic information and map information. The navigation device 105 generally includes a CPU, memory (program memory, working memory), etc., performing detection of the present position of the vehicle, route search/guide, search and provision of various information (map, traffic information, peripheral information, etc.), etc. The output device 106 includes a display device (liquid crystal display, CRT display, etc.), a speaker, etc., performing image display and audio guidance of various information and a guide route.

Figure 2:
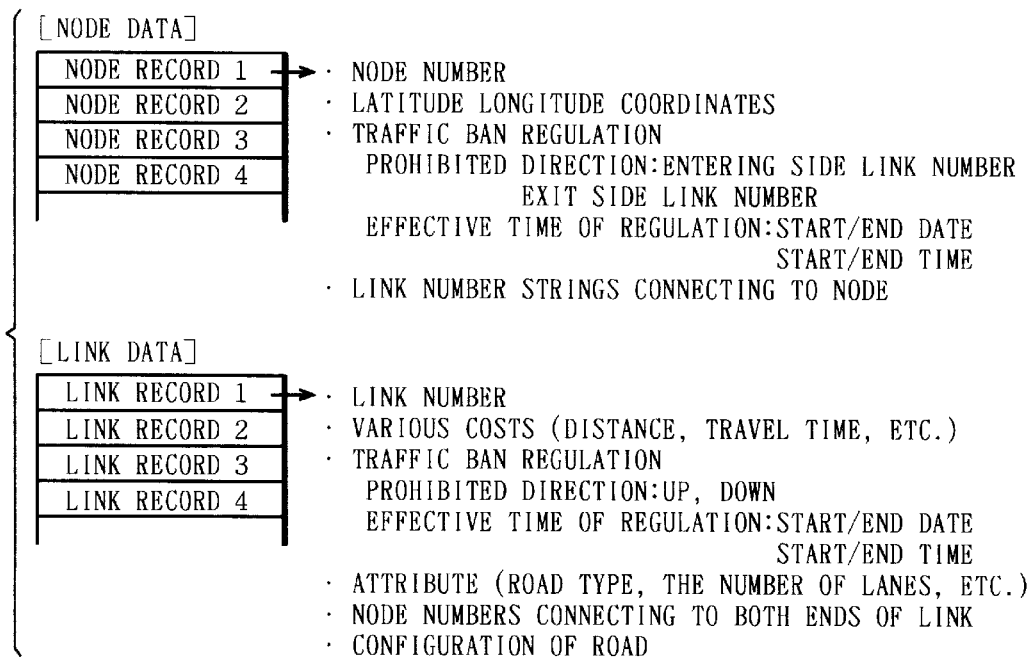
FIG. 2 is a diagram showing an example of structure of map data recorded in a recording device in FIG. 1.

Described herein is map data recorded in the recording device 103. FIG. 2 is a diagram showing an example of structure of the map data recorded in the recording device 103 in FIG. 1. Normally, the map data is composed of two broad components. A first component is node data of information on intersections. A second component is link data of information on roads linking the intersections. In the present embodiment, the recording device 103 records, in addition to the general data described above, the composite intersection traffic regulation which is complicated traffic regulation over a plurality of intersections and cannot be represented by the ordinary intersection traffic regulation information (no-right/left-turn information, etc.) and one-way traffic information. Its recording method will be described later.

Described below is an operation of the car navigation system structured as discussed above. The functions of the car navigation system include a route selecting/guiding function, a present position display function, an information searching/providing function, etc. Described herein is the route selecting/guiding function which is of interest for the present invention. First, in the input device 101, a user sets a starting point and a destination. That is, the user operates the input device 101 to scroll images of the map displayed on the output device 106 and inputs desired points as the starting point and the destination. The user may use the detected present position of the vehicle by the locator 102 as the starting point.

Next, on the basis of the positions of the starting point and the destination set as described above, the navigation device 105 adopts the most adjacent nodes on the map stored in the recording device 103 or nodes connecting to the most adjacent links as a starting node and a destination node. Furthermore, the navigation device 105 calculates the minimum cost route using the known Dijkstra method, etc., to transform the obtained route into link strings, node strings, or coordinate strings as a guide route. However, the navigation system 105 selects a route which complies not only with the ordinary intersection traffic regulation and the one-way traffic regulation, but also with the composite intersection traffic regulation. At this time, the navigation device 105 may change the route to be selected using a method such as changing link costs by the traffic information obtained by the communication device 104. The navigation device 105 sets the guide route based on the search results selected as described above to calculate the present position of the vehicle from the position information detected by the locator 102 for guide on the guide route to the destination.

Finally, the output device 106 receives instructions from the navigation device 105 to provide the user with the guide information by audio and display.

Figure 3:
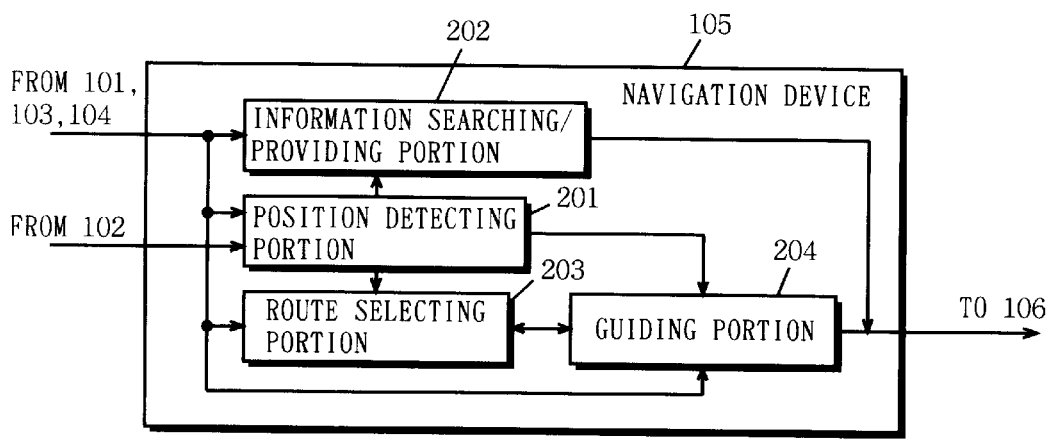
FIG. 3 is a functional block diagram showing an example of structure of the navigation device shown in FIG. 1.

FIG. 3 is a functional block diagram showing an example of a structure of the navigation device 105 shown in FIG. 1. In FIG. 3, the navigation device 105 includes a position detecting portion 201, an information searching/providing portion 202, a route selecting portion 203, and a guiding portion 204.

The position detecting portion 201 performs map matching with respect to the road network of the map data recorded in the recording device 103 based on the position information detected by the locator 102 and specifies the present position of the vehicle using the vehicle position correcting information inputted in the input device 101. The information searching/providing portion 202 searches and provides various information. For example, the information searching/providing portion 202 displays the map data recorded in the recording device 103 on the output device 106 based on the present position detected by the position detecting portion 201, changes the display areas and the degree of details of the map in the output device 106 according to requests from the user inputted by the input device 101, and displays the traffic information obtained in the communication device 104 to the output device 106. The route selecting portion 203 reads the required areas of the map data from the recording device 103, determines the starting point and the destination based on the present position of the vehicle detected in the position detecting portion 201 and the point information inputted in the input device 101, and selects the minimum cost route between the starting point and the destination in consideration of the composite intersection traffic regulation over a plurality of intersections as well as the ordinary intersection traffic regulations and one-way traffic regulations. Further, the guiding portion 204 guides the vehicle to the destination indication which direction to follow, using the map data obtained by the recording device 103 and the present position of the vehicle detected by the position detecting portion 201 based on the guide route selected by the route selecting portion 203. In addition, the route selecting portion 203 which performs route selecting processing is further described in detail below.

(1) A First Example of a Structure of the Route Selecting Portion 203

Figure 4:
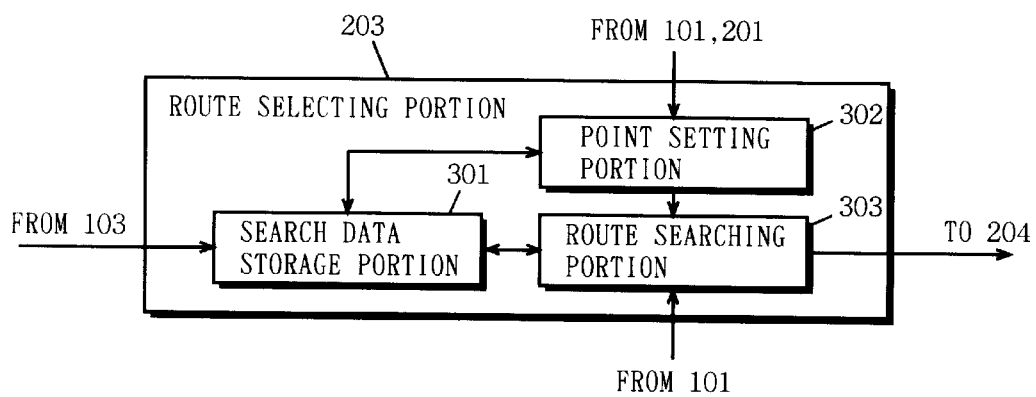
FIG. 4 is a functional block diagram showing a first example of structure of a route selecting portion shown in FIG. 3.

FIG. 4 is a functional block diagram showing a first example of structure of the route selecting portion 203 shown in FIG. 3. In FIG. 4, the route selecting portion 203 includes a search data storage portion 301, a point setting portion 302, and a route searching portion 303.

The search data storage portion 301 reads from the recording device 103 and then stores the areas of the map data required for route search and point setting, and records intermediate data at the time of searching, etc. The point setting portion 302 sets the present position of the vehicle detected in the position detecting portion 201 as the starting point and the point inputted in the input device 101 as the destination to set the starting node and the destination node corresponding thereto on the map. The route searching portion 303 obtains the minimum cost route from the starting node to the destination node set by the point setting portion 302 using the known Dijkstra method, etc.

Described in detail below is an operation of the first example of a structure of the route selecting portion 203 structured as discussed above according to flow charts.

Figure 5:
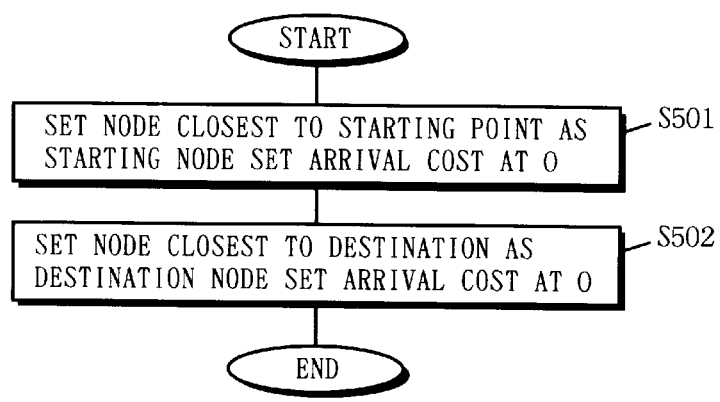
FIG. 5 is a flow chart showing the operation of a point setting portion shown in FIG. 4.

FIG. 5 is a flow chart showing operation of the point setting portion 302 in FIG. 4. First, in step S501 in FIG. 5, the point setting portion 302 sets a node closest to the starting point (the present position of the vehicle detected by the position detecting portion 201, for example) as the starting node to set an arrival cost (0, for example). Next, in step S502, the point setting portion 302 sets a node closest to the destination (the point inputted by the user with the input device 101, for example) as the destination node to set the arrival cost (0, for example).

Figure 6:
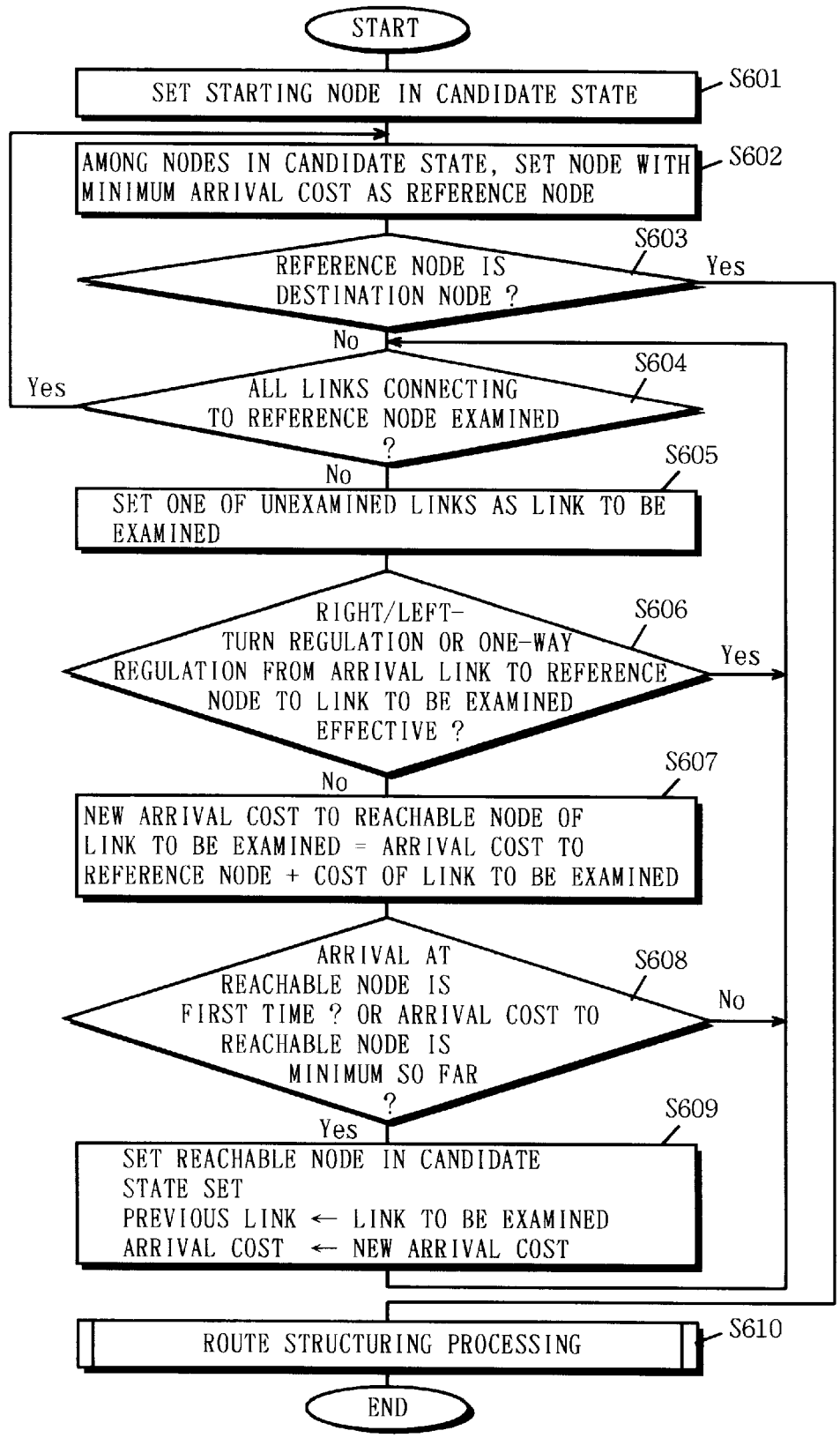
FIG. 6 is a flow chart showing the route search processing of a route searching portion shown in FIG. 4.

Next, the route searching portion 303 executes route searching processing for obtaining the minimum cost route. FIG. 6 is a flow chart showing the route search processing of the route searching portion 303. First, in step S601 in FIG. 6, the route searching portion 303 sets the starting node in a candidate state. Next, in step S602, the route searching portion 303 sets a node whose arrival cost is minimum among nodes in a candidate state (for the first time, the starting node) as a reference node, and excludes it from being in a candidate state. Further, in step S603, the route searching portion 303 examines whether the reference node is the destination node or not, and when it is the destination node, the route searching portion 303 goes on to route structuring processing in step S610. Otherwise, the route searching portion 303 goes on to step S604. In step S604, the route searching portion 303 checks whether to complete examining all links connected to the reference node. When they have all been examined, the route searching portion 303 returns to step S602 to search for the next reference node. When an unexamined link exists, the route searching portion 303 takes one of the unexamined links as a link to be examined in step S605. Then, in step S606, the route searching portion 303 checks the intersection traffic regulation (right/left-turn regulation) on the reference node and the one-way traffic regulation on the link to be examined, returning to step S604 when traffic is prohibited in the direction of the link to be examined and going on to next step S607 otherwise. In step S607, the route searching portion 303 adds the cost of the link to be examined to the arrival cost to the reference node to take the result as a new arrival cost to a node which connects to the link to be examined and is opposite to the reference node (reachable node). Next, going on to step S608, the route searching portion 303 determines whether the arrival to the reachable node is for the first time or whether the new arrival cost is minimum among the arrival costs which have been obtained, and then goes on to step S609 when the determination is positive and returns to step S604 when negative. In step S609, the route searching portion 303 sets the reachable node in a candidate state. Further, as the intermediate data for search, the route searching portion 303 records the link to be examined as a previous link and the new arrival cost as the arrival cost in the search data storage portion 301 to return to step S604. The route searching portion 303 repeats the above processing to perform the route search processing.

Figure 7:
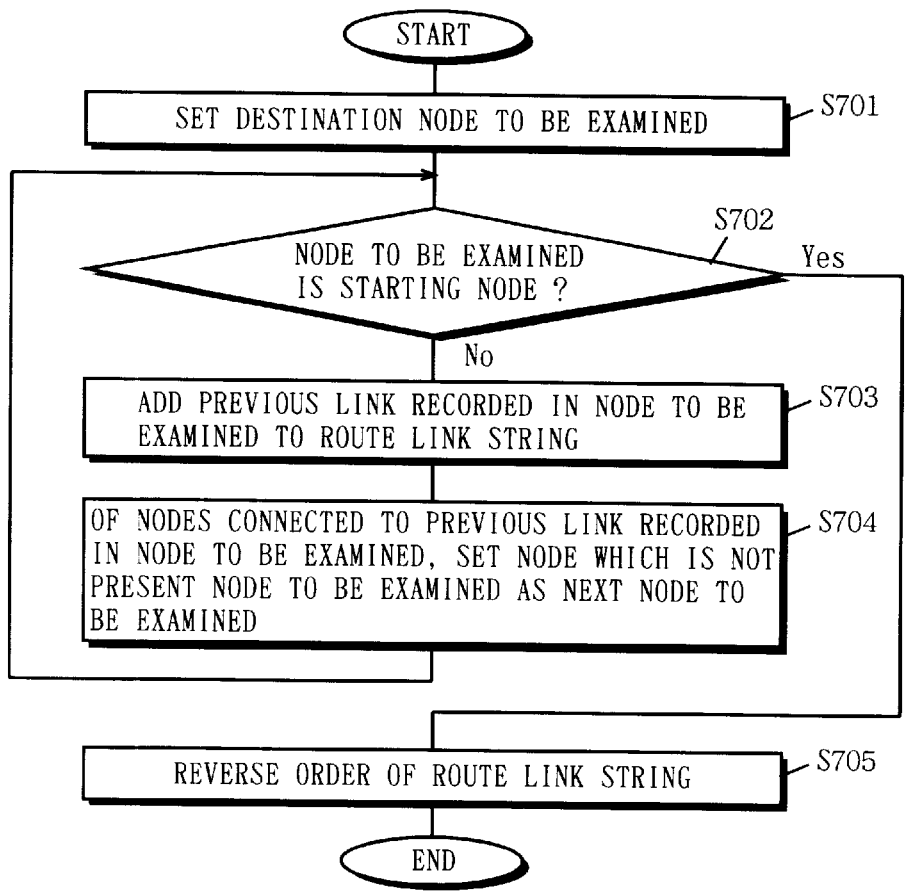
FIG. 7 is a flow chart showing the route structuring processing executed by the route searching portion in FIG. 4.

Finally, described is the route structuring processing in subroutine step S610 shown in FIG. 6. FIG. 7 is a flow chart showing the route structuring processing executed by the route searching portion 303 in FIG. 4 in step S610. First, in step S701 in FIG. 7, the route searching portion 303 sets the destination node to be examined. Next, the route searching portion 303 goes on to step S702 to check whether the node to be examined is the starting node, taking the route link string in reverse order as a guide route when it is the starting node. On the other hand, when the node to be examined is not the starting node, the route searching portion 303 goes on to step S703 to add the previous link of the node to be examined recorded in the search data storage portion 301 as the intermediate data for search to the road link string. Next, the route searching portion 303 goes on to step S704, taking a node which is not the present node to be examined of two nodes connecting to the previous link recorded at the node to be examined as a new node to be examined to return to step S702. The route searching portion 303 repeats the above processing to perform the route structuring processing.

Here, recorded in the recording device 103 in FIG. 1 is map data described next for allowing selection of a route compliant with the composite intersection traffic regulation even if the route selecting portion 203 uses the above described route searching method which is similar to the conventional one. Described below is an example of a network structure of the map data.

(1-A) Separation of the Network

Figure 8:
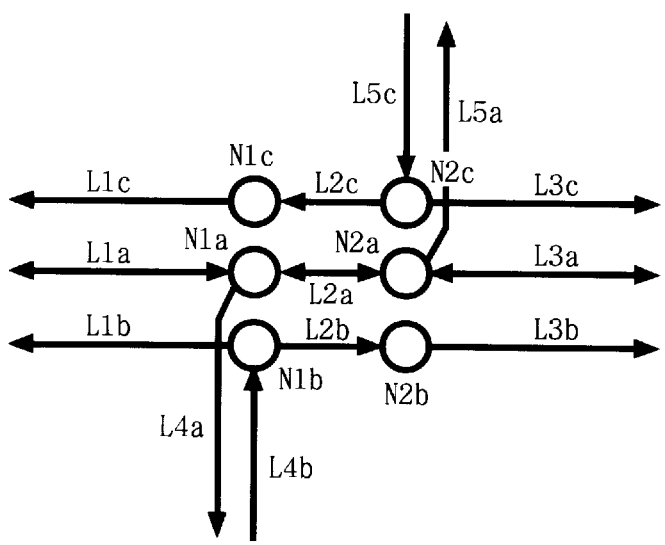
FIG. 8 is a diagram showing a first example of network structure representing composite intersection traffic regulation shown in FIG. 23.
Figure 23:
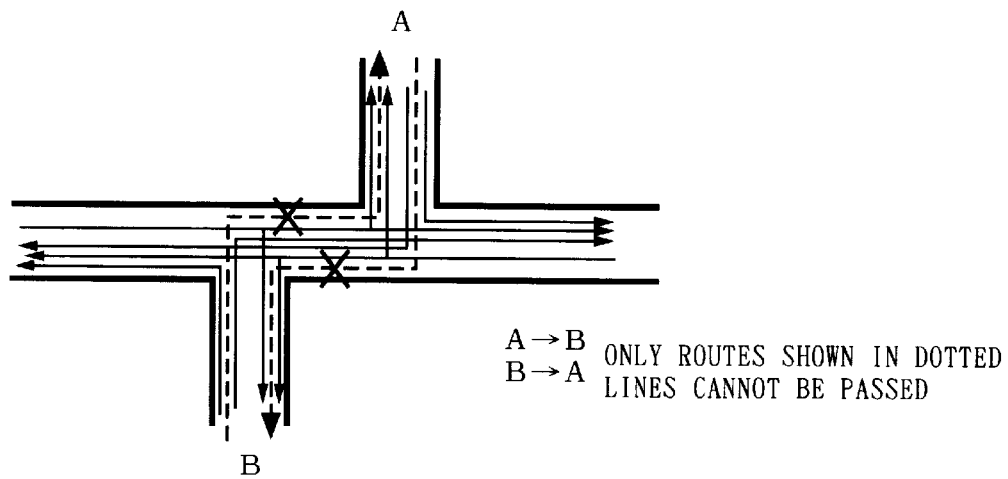
FIG. 23 is a diagram showing an example of traffic regulation (composite intersection traffic regulation) which cannot be represented in the conventional method.
Figure 24:
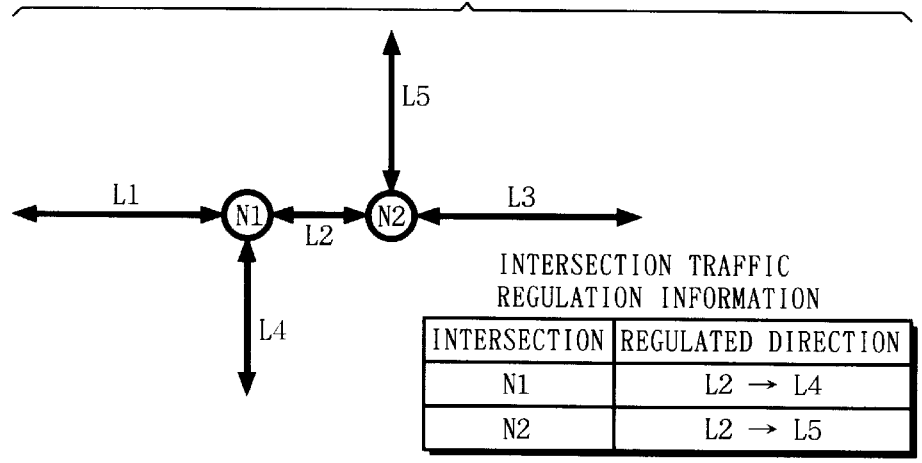
FIG. 24 is a diagram showing an example which represents the composite intersection traffic regulation in FIG. 23 using the intersection traffic regulation on a general network.
Figure 25:
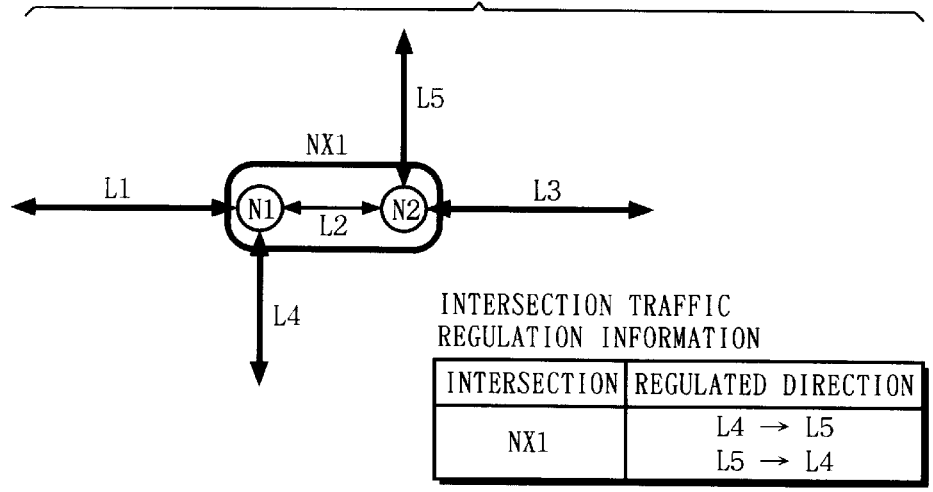
FIG. 25 is a diagram showing an example of a unified intersection.
Figure 26:
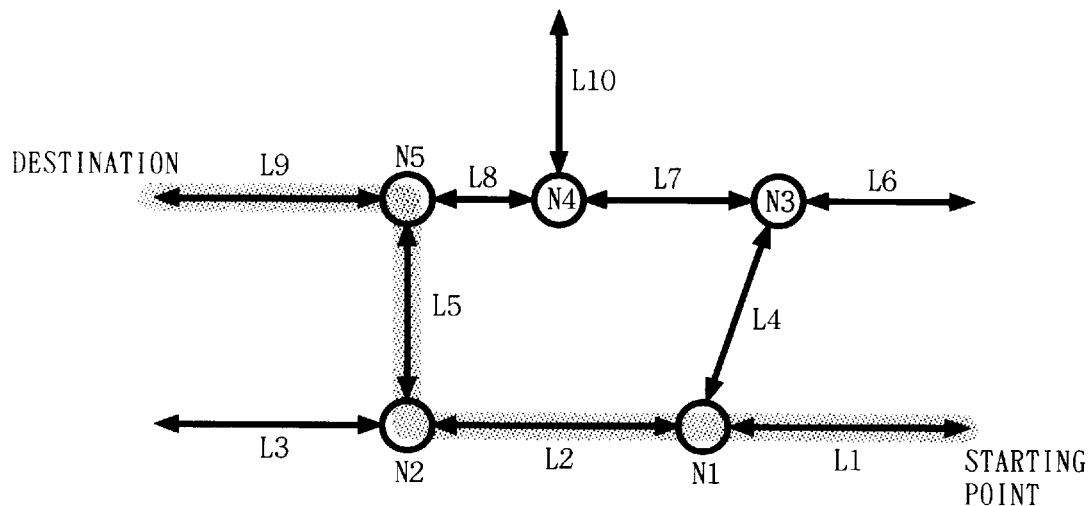
FIG. 26 is a diagram showing an example of a road network in a case where a selected route is not the minimum cost route when the conventional unified intersection method is used.
Figure 27:
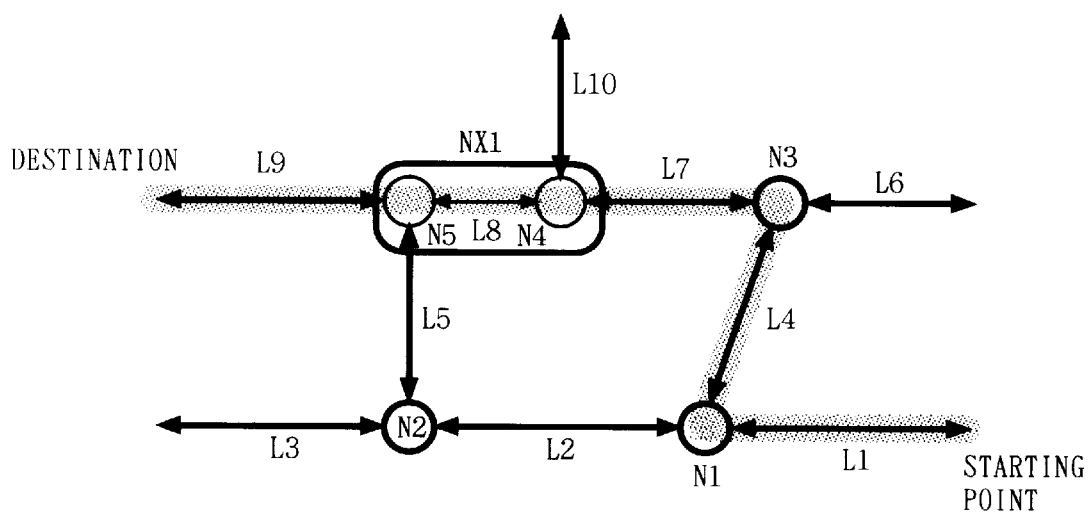
FIG. 27 is a diagram representing the road network in FIG. 26 with the conventional unified intersection method.

FIG. 8 is a diagram showing a first example of a network structure representing the composite intersection traffic regulation shown in FIG. 23. In this example of structure, the nodes N1 and N2 and the links L1 to L5 used in the conventional general network shown in FIG. 24 are separated into a plurality of nodes and links, respectively. For example, the node N1 is separated into nodes N1a to N1c, and the link L1 is separated into links L1a to L1c. Then, the whole network is represented by separating the network into a road network (links: L1a, L2a, L3a, L4a, L5a; Nodes: N1a, N2a) in view of entering links (L1a, L3a) which the composite intersection traffic regulation does not affect and road networks α (links: L1b, L2b, L3b, L4b; nodes: N1b, N2b) and β (links: L1c, L2c, L3c, L5c; nodes: N1c, N2c) in view of the entering links (L4b, L5c) which the composite intersection traffic regulation affects, and further the one-way traffic regulations are set in the passable directions, allowing representation of the composite intersection traffic regulation.

Figure 9:
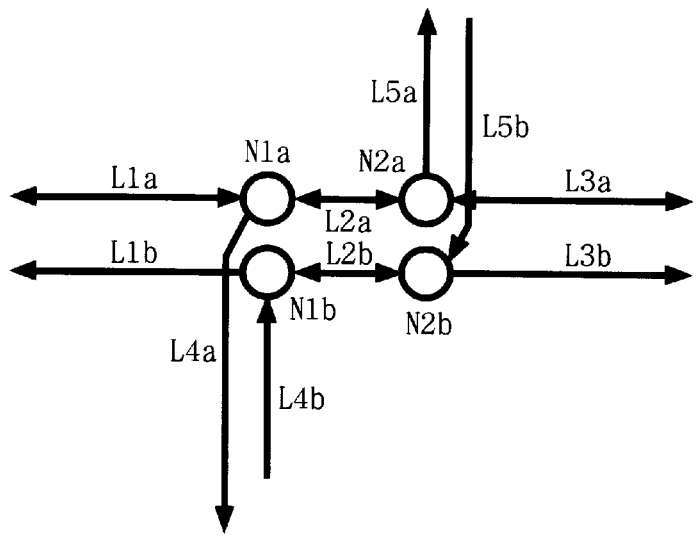
FIG. 9 is a diagram showing a second example of a network structure simplifying the network structure in FIG. 8.

The first example of the network structure can be simplified. FIG. 9 is a diagram showing a second example of network structure simplifying the network structure in FIG. 8. In this example of the structure, in view of the entering links which the composite intersection traffic regulation affects, although the one-way traffic regulations of the links (L2c, L2b) in the areas to be regulated are in a reverse direction, traffic directions of the exit links (L1b, L1c, L3b, L3c) are the same. Therefore, the second example synthesizes the road networks α and β to reduce the number of nodes and links to be separated.

Figure 10:
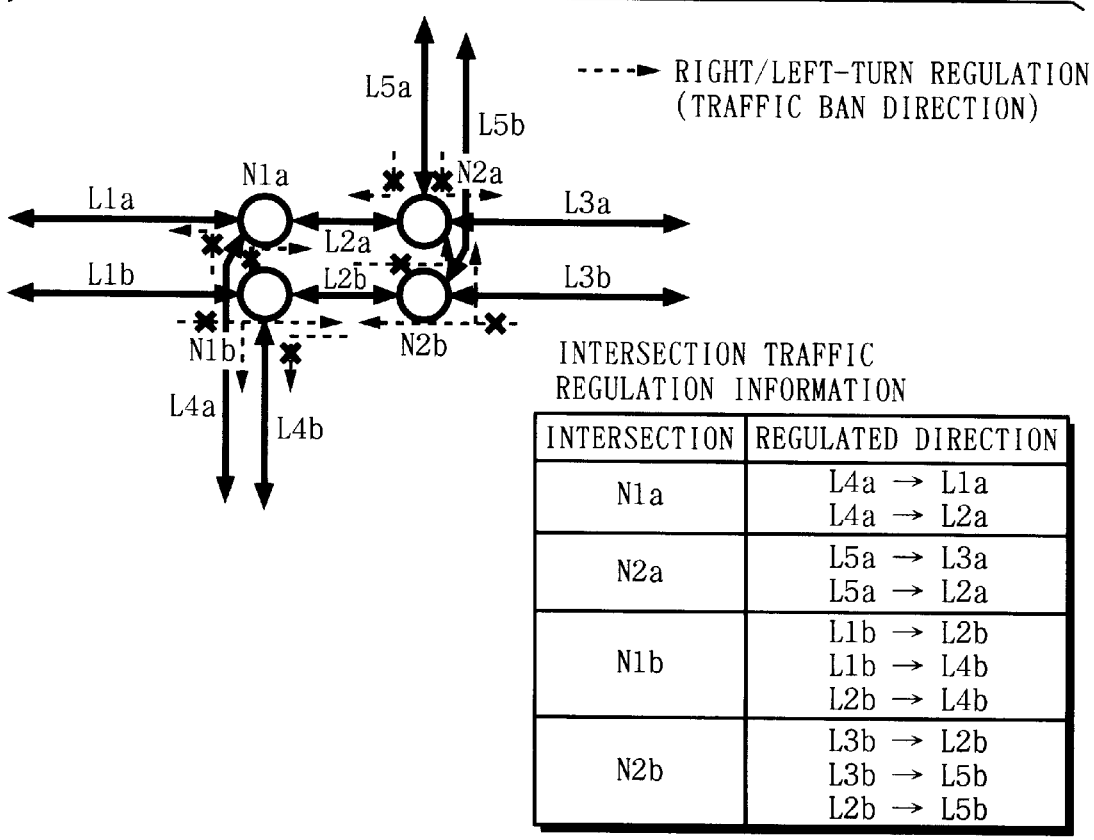
FIG. 10 is a diagram showing a third example of a network structure representing the composite intersection traffic regulation shown in FIG. 23.

Furthermore, the composite intersection traffic regulation can be represented using the conventional intersection traffic regulation (right-left turn regulation) instead of the one-way traffic regulations. FIG. 10 is a diagram showing a third example of a network structure representing the composite intersection traffic regulation shown in FIG. 23. This example of structure, in the second example of network structure shown in FIG. 9, represents the composite intersection traffic regulation using the conventional intersection traffic regulation (right/left-turn regulation) instead of the one-way traffic regulations.

In this way, by plurally separating the nodes and links where the composite intersection traffic regulation exists and setting the one-way traffic regulations only in the passable directions on the separated links or the conventional intersection traffic regulations in the impassable directions on the separated nodes, it is possible to represent the composite intersection traffic regulation only with the network structure of the map data, and further select the most suitable route compliant with the composite intersection traffic regulation without particular processing at the time of the search processing.

(1-B) Unification of the Separated Link

Figure 11:
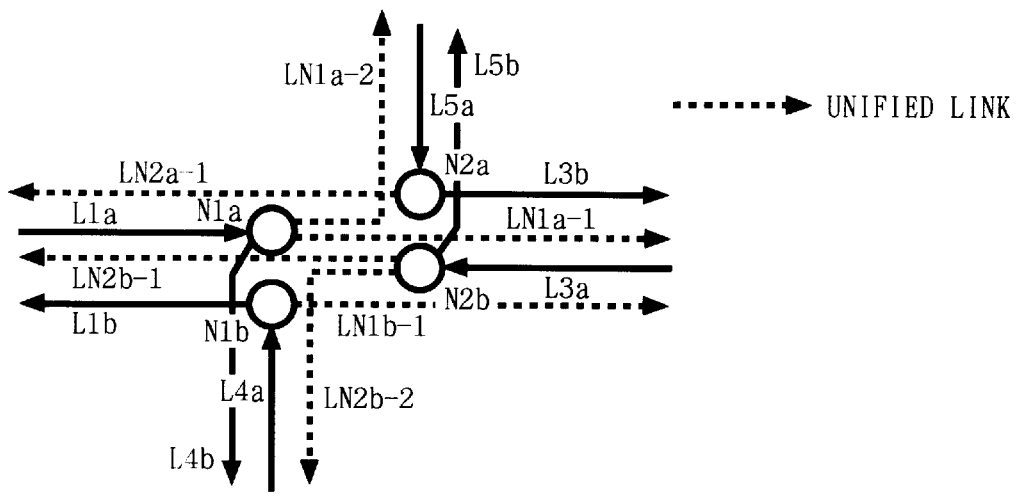
FIG. 11 is a diagram showing a fourth example of a network structure representing the composite intersection traffic regulation shown in FIG. 23.

FIG. 11 is a diagram showing a fourth example of network structure representing the composite intersection traffic regulation shown in FIG. 23. In this example of the structure, the nodes N1 and N2 and the links L1 to L5 for use in the conventional general network shown in FIG. 24 are each plurally separated. Then, in view of the entering links to the areas where the composite intersection traffic regulation exists (L1a, L3a, L4a, L5a), links directly extending from nodes to be first entered (N1a, N1b, N2a, N2b) to passable nodes outside the areas where the composite intersection traffic regulation exists are set. At this time, unified links which unify a plurality of links (LN1a-1, LN1a-2, LN1b-1, LN2a-1, LN2b-1, LN2b-2) are assumed. Furthermore, the one-way traffic regulations are set in the passable directions to represent the composite intersection traffic regulation. As in the above described third example of the network structure (refer to FIG. 10), the conventional intersection traffic regulation can be used in place of the one-way traffic regulation.

In this way, by plurally separating the nodes and links where the composite intersection traffic regulation exists, further assuming the unified link which unifies the plurality of links, and setting the one-way traffic regulations only in the passable directions on the separated links and the virtual unified links or setting the conventional intersection traffic regulation only in the impassable directions on the separated nodes it is possible to represent the composite intersection traffic regulation only with the network structure of the map data, and further select the most suitable route compliant with the composite intersection traffic regulation without particular processing at the time of the search processing.

(1-C) Virtual Link Setting Between the Separated Nodes

Figure 13:
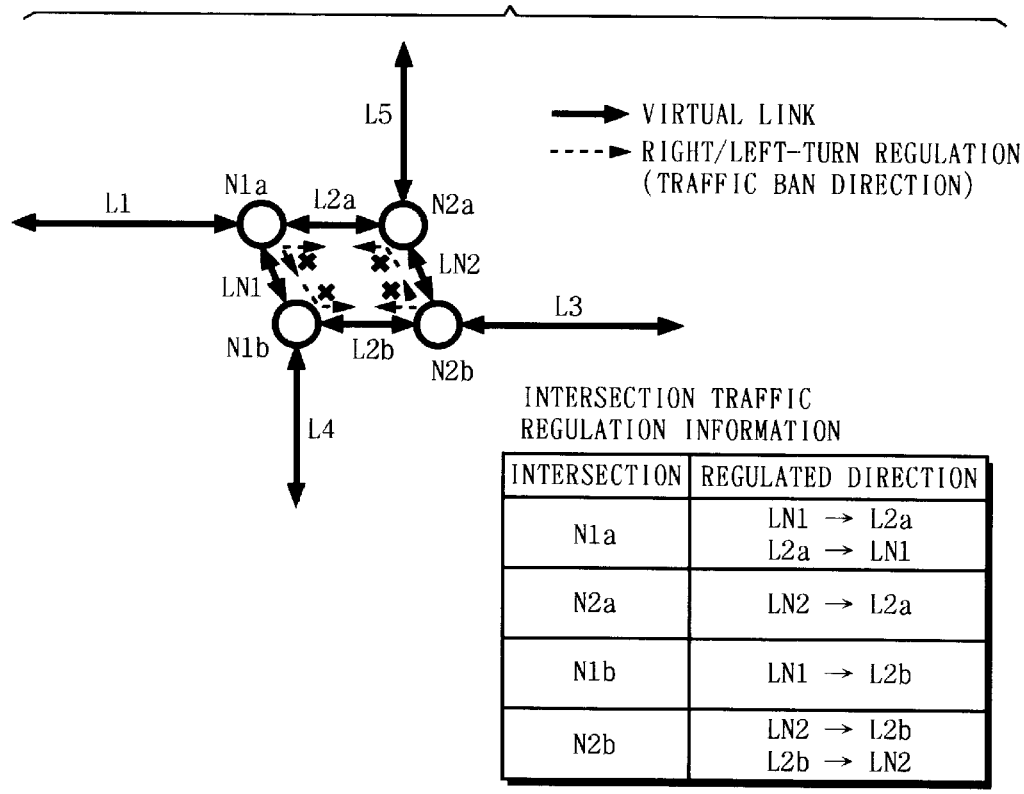
FIG. 13 is a diagram showing a sixth example of a network structure representing the composite intersection traffic regulation shown in FIG. 23.

FIG. 12 is a diagram showing a fifth example of network structure representing the composite intersection traffic regulation shown in FIG. 23. In addition, FIG. 13 is a diagram showing a sixth example of a network structure representing the composite intersection traffic regulation shown in FIG. 23. These fifth and sixth examples of a structure plurally separate the nodes N1, N2 and the links L1 to L5 for use in the general network shown in FIG. 24, and further set virtual links (LN1, LN2) between nodes separated from the same intersection. Then, in view of the entering links to the areas where the composite intersection traffic regulation exists (L1, L3, L4b, L5b in FIG. 12 or L1, L3, L4, L5 in FIG. 13), these examples of the structures set links in the passable directions in the areas where the composite intersection traffic regulation exists and set the conventional intersection traffic regulations and the one-way traffic regulations to allow representation of the composite intersection traffic regulation.

In this way, by plurally separating the nodes and links where the composite intersection traffic regulation exists, further setting the virtual links between separated nodes which belong to the same intersection, and setting the one-way traffic regulations only in the passable directions on the separated links and the virtual links and the conventional intersection traffic regulations in the impassable directions on the separated nodes, it is possible to represent the composite intersection traffic regulation only with the network structure of the map data, and further select the most suitable route compliant with the composite intersection traffic regulation without particular processing at the time of the search processing.

According to the above first example of the structure, as described in (1-A), by plurally separating the nodes and links where the composite intersection traffic regulation exists and setting the one-way traffic regulations only in the passable directions on the separated links or the conventional intersection traffic regulations in the impassable directions on the separated nodes, it is possible to represent the composite intersection traffic regulation only with the network structure of the map data, and further select the most suitable route compliant with the composite intersection traffic regulation without particular processing at the time of the search processing.

Further, as described in (1-B), by plurally separating the nodes and links where the composite intersection traffic regulation exists, further assuming the unified link which unifies the plurality of links, and setting the one-way traffic regulations only in the passable directions on the separated links and the unified links or setting the conventional intersection traffic regulation only in the impassable directions on the separated nodes, it is possible to represent the composite intersection traffic regulation only with the network structure of the map data, and further select the most suitable route compliant with the composite intersection traffic regulation without particular processing at the time of the search processing.

Further as described in (1-C), by plurally separating the nodes and links where the composite intersection traffic regulation exists, further setting the virtual links between separated nodes which belong to the same intersection, and setting the one-way traffic regulations only in the passable directions on the separated links and the virtual links and the conventional intersection traffic regulations only in the impassable directions on the separated nodes, it is possible to represent the composite intersection traffic regulation only with the network structure of the map data, and further select the most suitable route compliant with the composite intersection traffic regulation without particular processing at the time of the search processing.

(2) Second Example of Structure of the Route Selecting Portion 203

Figure 14:
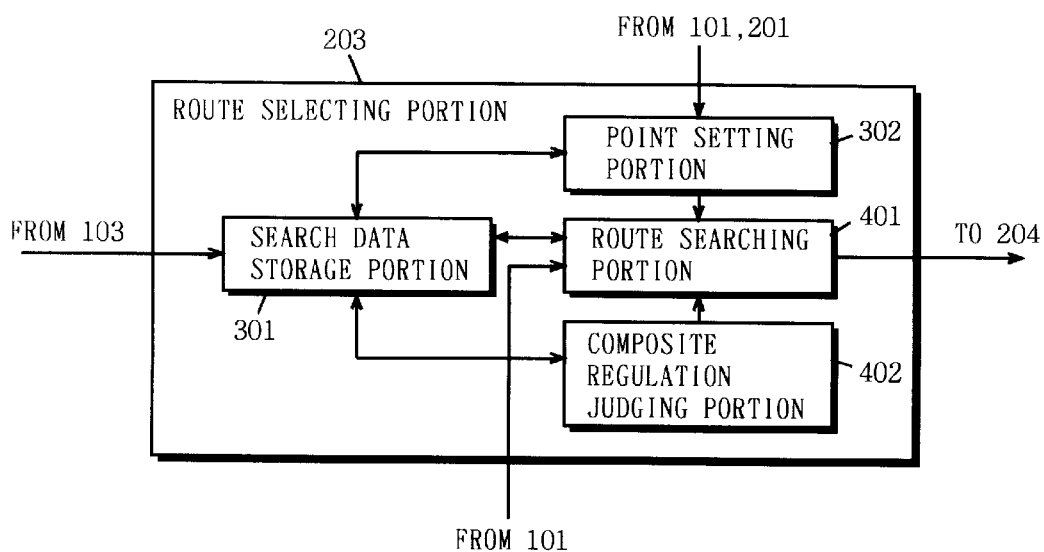
FIG. 14 is a functional block diagram showing a second example of a structure of the route selecting portion shown in FIG. 3.

FIG. 14 is a functional block diagram showing a second example of structure of route selecting portion 203 shown in FIG. 3. In FIG. 14, the route selecting portion 203 includes a search data storage portion 301, a point setting portion 302, a route searching portion 401, and a composite regulation judging portion 402.

The search data storage portion 301 reads from the recording device 103 and then stores areas of the map data required for route search and point setting, and records intermediate data at the time of search, etc. The point setting portion 302 sets the present position of the vehicle detected in the position detecting portion 201 as the starting point and the point inputted in the input device 101 as the destination to set the starting node and the destination node corresponding thereto on the map. The route searching portion 401 obtains the minimum cost route from the starting node to the destination node set in the point setting portion 302 using the known Dijkstra method, etc. Further, the composite regulation judging portion 402 judges whether the composite intersection traffic regulation is effective during route search processing in the route searching portion 401 to notify the route searching portion 401 of the results.

Described in detail below is an operation of the second example of a route selecting portion 203 structured as described above according to flow charts. Since the second example of the structure is different from the first example in the part of processing of the route searching portion 401 and the processing of the composite regulation judging portion 402, only different parts are described herein.

Figure 15:
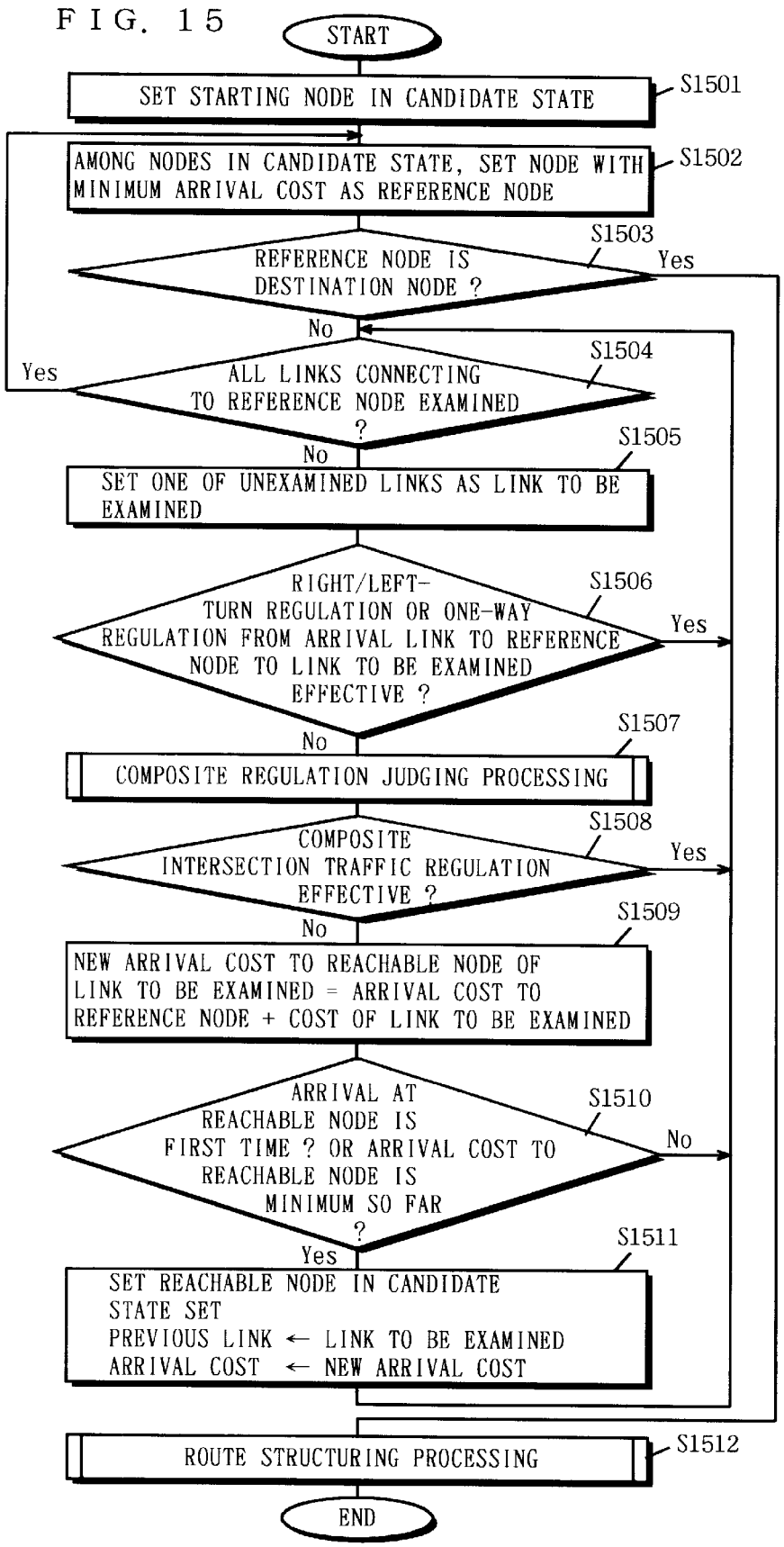
FIG. 15 is a flow chart showing the route search processing of a route searching portion shown in FIG. 14.

FIG. 15 is a flow chart showing the route search processing of the route searching portion 401 shown in FIG. 14. This flow chart is different from the flow chart of the route search processing of the route searching portion 303 (refer to FIG. 6) in that steps S1507 and S1508 are added between step S1506 (corresponding to step S606 in FIG. 6) and step S1509 (corresponding to step S607 in FIG. 6). Steps S1501 to S1506 in FIG. 15 correspond to steps S601 to S606 in FIG. 6, respectively, and steps S1509, S1510, S1511, and S1512 in FIG. 15 correspond to steps S607, S608, S609, and S610 in FIG. 6, respectively. After selection of a link to be examined connecting to the reference node and a checking as to the ordinary intersection traffic regulations and one-way traffic regulations, the composite regulation judging portion 402 judges in step S1507 whether the composite intersection traffic regulation is effective (composite regulation judging processing).

Figure 16:
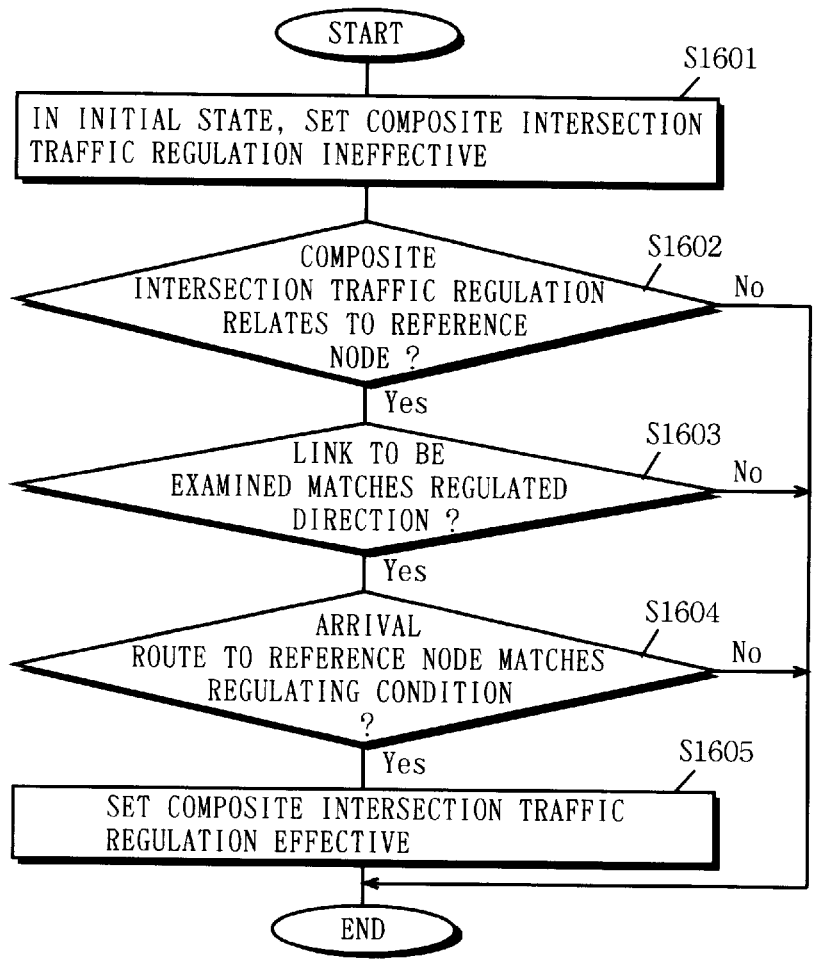
FIG. 16 is a flow chart showing the composite regulation judge processing executed by a composite regulation judging portion in FIG. 14.

FIG. 16 is a flow chart showing the composite regulation judging processing executed by the composite regulation judging portion 402 in FIG. 14 in the above subroutine step S1507. In step S1601, the composite regulation judging portion 402 judges, at the initial state, that the composite intersection traffic regulation is not effective. Next, the composite regulation judging portion 402 judges in step S1602 whether the reference node relates to the composite intersection traffic regulation, going on to step S1603 when the judgement is positive and ending the processing when negative. In step S1603, the composite regulation judging portion 402 judges whether the link to be examined matches the regulated direction of the composite intersection traffic regulation or not, going on to step S1604 if it matches and ending the processing when it does not match. In step S1604, the composite regulation judging portion 402 examines the arrival route to the reference node from the search intermediate data recorded in the search data storage portion 301 to judge whether the arrival route matches the regulating conditions of the composite intersection traffic regulation. At this time, the composite regulation judging portion 402 goes on to step S1605 when judging a match, and ends the processing otherwise. In step S1605, the composite regulation judging portion 402 judges that the composite intersection traffic regulation is effective. The composite regulation judging processing now ends.

Next, the processing proceeds to step S1508 in FIG. 15. When the route searching portion 401 judges that the composite intersection traffic regulation is effective in the above composite regulation judging processing, the processing returns to step S1504 and then the search processing to the link to be examined is terminated. Further, when the route searching portion 401 judges that the composite intersection traffic regulation is not effective, the processing goes on to step S1509 and then the search processing to the link to be examined is continued.

Here, in order to select the suitable route according to the second example of structure shown in FIG. 14, it is required to record in the recording device 103 (refer to FIG. 1) the composite intersection traffic regulation information which is the complicated intersection traffic regulation over a plurality of intersection in addition to the map data recorded in the same general network structure as the conventional one. Described below are examples of the composite intersection traffic regulation information.

Figure 17:
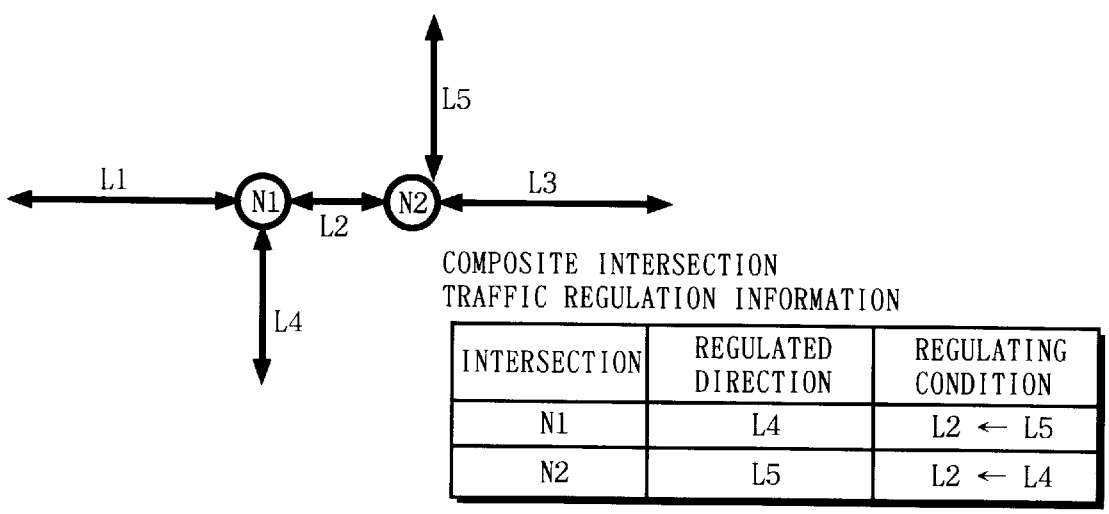
FIG. 17 is a diagram showing a first example of the composite intersection traffic regulation information.

FIG. 17 is a diagram showing a first example of the composite intersection traffic regulation information. The first example records passage directions to be regulated (regulated direction) and passage conditions for making the regulation effective (regulating condition) as strings of link numbers or node numbers, for example, at the intersection for which regulation is finally required. For example, recorded in an intersection N2 is the information that the vehicle cannot pass through to a link L5, which is in a regulated direction, only when passing through links L2←L4, which are written as the regulating condition.

By judging whether or not it is possible to pass through to a link in the regulated direction from these composite intersection traffic regulation information and the arrival route information to the point to be searched (the reference node) at the time of the search processing to perform processing of not expanding the search if it is impassable, it is possible to select the most suitable route compliant with the composite intersection traffic regulation with a relatively simple map data structure.

Figure 18:
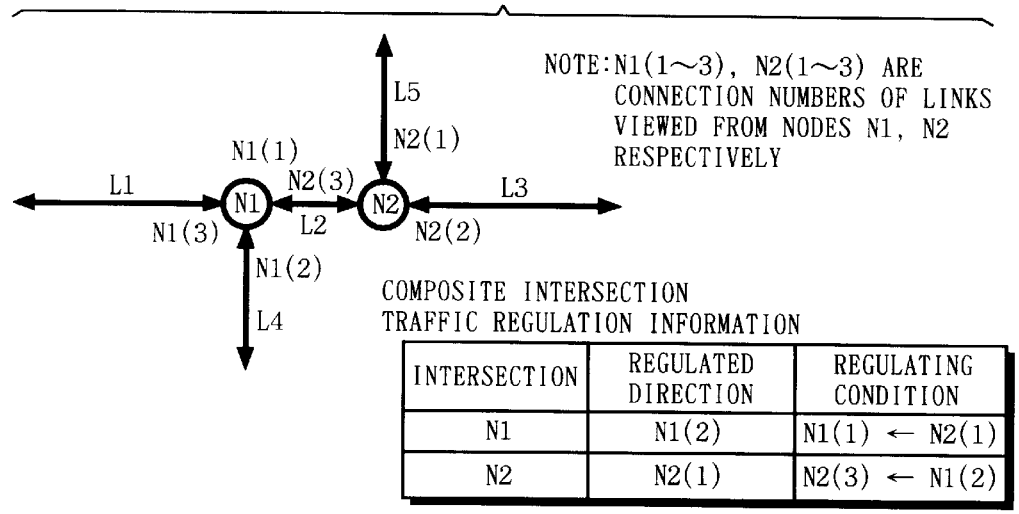
FIG. 18 is a diagram showing a second example of the composite intersection traffic regulation information.

FIG. 18 shows a second example of the composite intersection traffic regulation information. The second example records passage directions to be regulated (regulated direction) and passage conditions for which regulation is required (regulating condition) with connection numbers of the links which connect to the nodes (a recording order of "link number strings connecting to the node data", for example), at the intersection for which regulation is finally required.

Thus since the number of links connectable to one node is generally limited (eight, for example), it is possible to specify the links with at least four bits and compress the data size compared to the case in FIG. 17.

In the above description, while the composite intersection traffic regulation information is recorded at the intersection to be finally regulated (exit side), the information may be recorded in the first intersection (entering side) included in the regulating condition of the composite intersection traffic regulation, and the regulated direction and the regulating condition may be recorded during the search.

Figure 19:
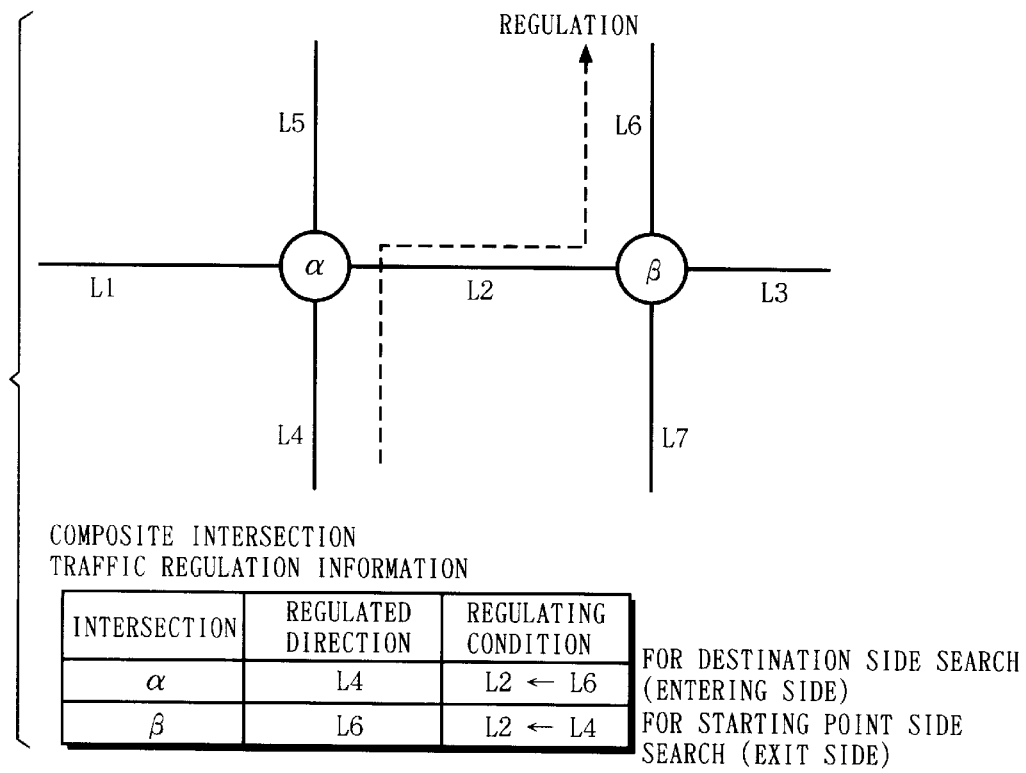
FIG. 19 is a diagram showing a third example of the composite intersection traffic regulation information.

FIG. 19 is a diagram showing a third example of the composite intersection traffic regulation information. The third example is suitable for a bilateral search method for searching from both of the starting point and the destination. Since the bilateral search method is known in Japanese Patent Laying-Open No. 6-323863, etc., its description is omitted. This example records the same information not only in the intersection (exit side) to be finally regulated at the time of the search from the starting point (starting point side search) but also in the first intersection (entering side) which is included in the regulating condition of the composite intersection traffic regulation and is finally regulated at the time of the search from the destination (destination side search). However, at this time, data in which the regulating direction is reversed as described below is recorded in both of the entering and exit sides for the reason that since the search from the destination is performed by going back to the route to the starting point, the composite intersection traffic regulation written in the intersection on the entering side is required to be in the reverse direction to the actual regulating direction.

Exit side (β): The link L6 cannot be used when the search processing has arrived through the links in order of L2←L4.

Entering side (α): The link L4 cannot be used when the search processing has arrived through the links in order of L2←L6.

In this way, by doubly writing the same composite intersection traffic regulation in both of the exit side node and the entering side node, it is possible to refer to the regulation contents without going back to the exit side node for searching for the applicable composite intersection traffic regulation even at the time of the destination side search, allowing search time savings. The composite intersection traffic regulation with the same contents may be written relating to links of the exit side and the entering side.

Figure 20:
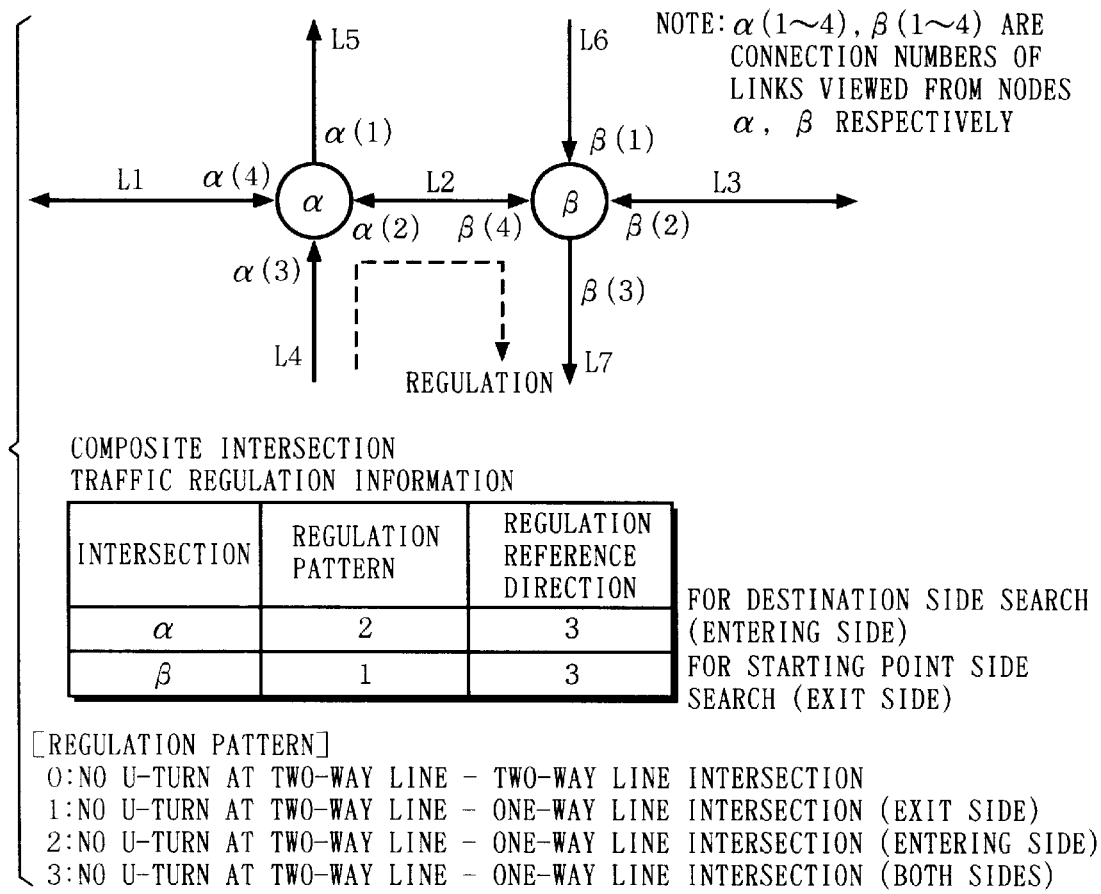
FIG. 20 is a diagram showing a fourth example of the composite intersection traffic regulation information.
Figure 21:
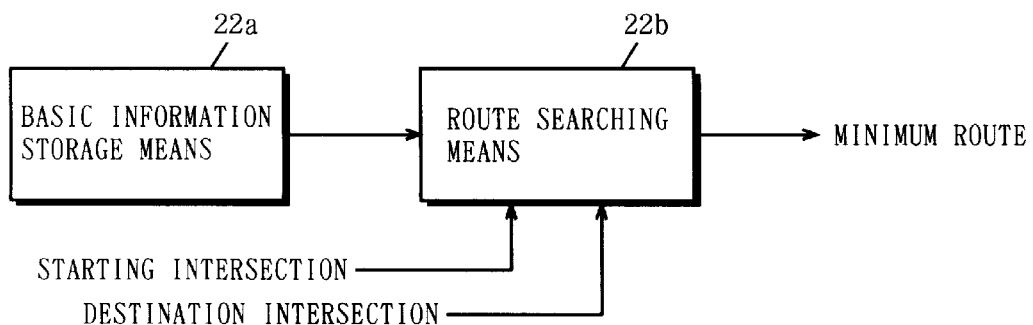
FIG. 21 is a block diagram showing the structure of the conventional vehicle route guiding apparatus.
Figure 22A:
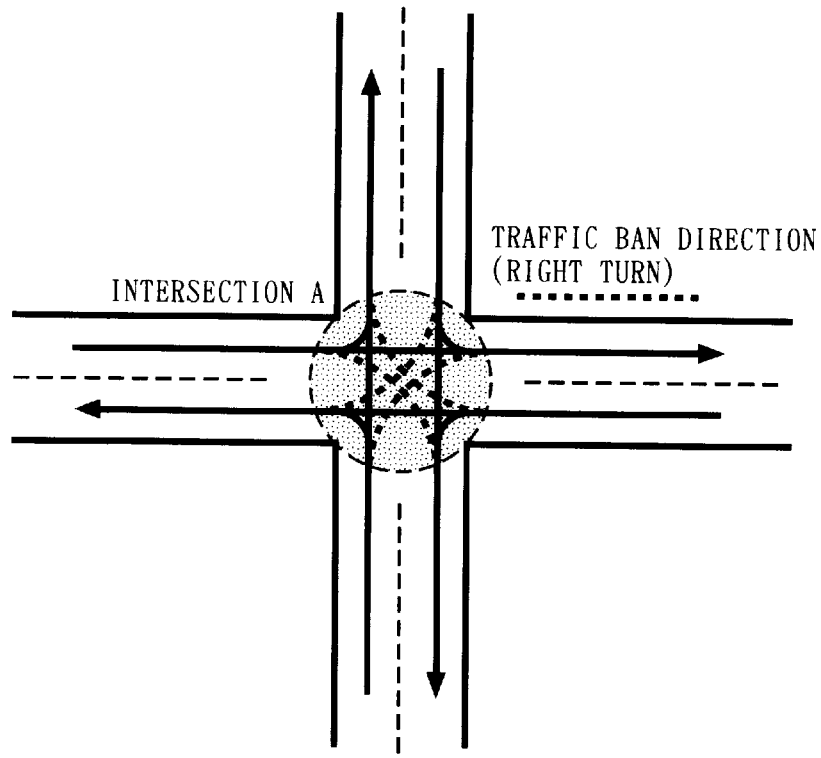
FIG. 22(a) and FIG. 22(b) are diagrams showing an example of a representation of a road network of the conventional art (no-right/left-turn regulation)
Figure 22B:
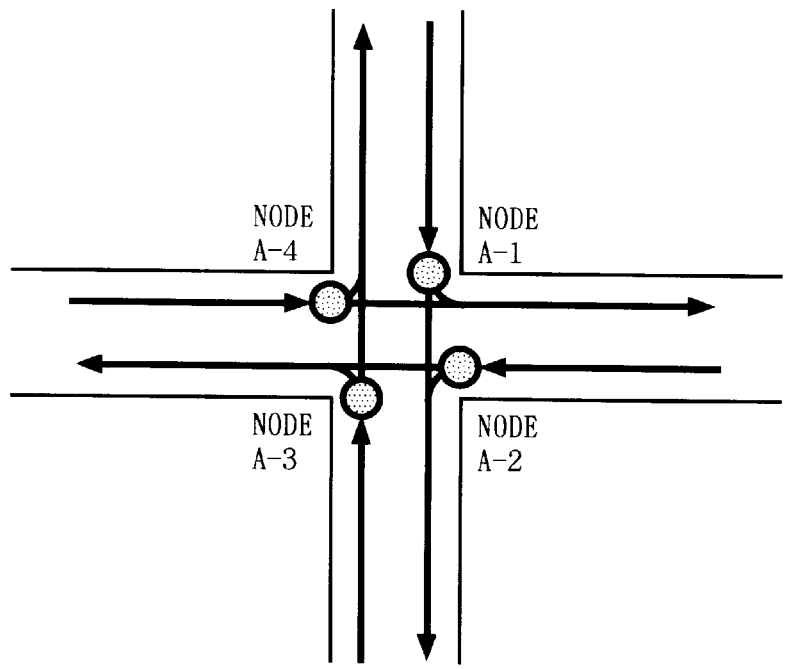

FIG. 20 is a diagram showing a fourth example of the composite intersection traffic regulation information. The fourth example makes patterns of the typical composite intersection traffic regulations such as no-U-turn in the place with the large number of regulations such as the place where two-way line roads or a two way line road and a one-way line road are crossed and records the composite intersection traffic regulation using identifiers indicating these kinds of patterns. As shown in FIG. 20, in this example, the links connecting to the node are recorded as described below assuming that they are written in "the link number string connecting to the node" of the node data in a clockwise order from the north.

Entering side (α): pattern 2, the reference entering link is 3.

Exit side (β): pattern 1, the reference exit link is 3.

Here, in the case where the regulation is judged at the exit side (β), when the search processing passes through a link β(4)=L2 which makes a right-turn to the direction of a link β(3)=L7 that is the third ("regulation reference direction" number) link of connecting links at the node (β) (i.e., the search processing passes through a link whose connection number of the link is incremented by 1 or a link with connection number 1 if no applicable connection number exists) and has also passed through a link α(3)=L4 that is the third ("regulation reference direction" number) link of connecting links at the previous node (α), it is assumed that the search processing cannot pass to the direction of the link β(3)=L7. Other patterns are handled in the same way to judge the composite intersection traffic regulation.

In this way, as to the typical composite intersection traffic regulation with a large number of regulations, by not recording all information but only the identifiers indicating the kinds of regulation patterns and the connection numbers of the reference links for the regulation, it is possible to compress the size of the record data.

As described above, according to the second example of the structure, by recording the passage direction to be regulated (regulated direction) and the passage condition (regulating condition) for effecting the regulation in the intersection where the regulation is finally effective with the link number or the node number string, etc., judging whether it is possible to pass through to the next point from the composite intersection traffic regulation information and the arrival route information to the point to be searched at the time of the search processing, and not extending the search if impassable, it is possible to select the most suitable route compliant with the composite intersection traffic regulation with a relatively simple data map structure.

In addition, by recording the passage directions to be regulated (regulated direction) and the passage conditions for effecting the regulation with the connection numbers of the links which connect to the nodes (a recording order of "link number strings connecting to the node data", for example), it is possible to specify the link and compress the data size.

Further, by doubly writing the same composite intersection traffic regulation in both of the exit side node or link and the entering side node or link, it is possible to refer to the regulation contents without going back to the exit side node or link for searching for the applicable composite intersection traffic regulation even at the time of the destination side search, thereby allowing search time savings.

Finally, as to the typical composite intersection transfer regulation with a large number of regulations, by not recording all information but only the regulation patterns and the connection numbers of the reference links for its regulation, it is possible to compress the record data size.

All of the above described examples of the structure may be structured as a hardware or a program such as microcomputer multitasking. Further, hierarchical maps may be recorded in the recording device 103, and the route searching portion 303 (or 401) may perform the search using a detailed map in the vicinity of the starting point and the destination and using a different map in the degree of details for a long distance route therebetween according to the distance. Furthermore, the route search processing in the route searching portion 303 (or 401) may be not only the one-way traffic search from the starting point but also the one-way traffic search from the destination and the two-way search. Further, the locator 102 may take any structure only if the structure is capable of detecting the position information of the vehicle. Further, although the input device 101 scrolls the map images displayed in the output device 106 to specify the positions in the above examples, the input device 101 may specify the positions using a method of selecting altitudes and latitudes previously stored. Further, the point setting portion 302 may set the position inputted by the user as the starting point. Further, although the closest nodes to the starting point and the destination are set as the starting node and the destination node, respectively, in the above examples, points on the closest links or a plurality of points may be set as the starting node and the destination node. Further, although the Dijkstra method is mentioned herein as being used as the searching method, any method may be used only if the method is to obtain the minimum cost route between two points based on the cost information for each link. Further, although the output device 106 herein performs guidance by displays and, an automatic control portion may be added to provide the selected route for the control system of the automobile. Further, time regulation information provided by the communication device 104 as the traffic information may be obtained to be reflected on the route search results in the same way.

Further, the present invention can easily be embodied in other independent computer systems by being realized by a program, which is recorded in a recording medium such as a floppy disk and then transferred to the system. In this case, the recording medium is not only a floppy disk but also anything which can record a program such as an optical disk, an IC card, a ROM cassette, etc., to realize the present invention in the same way.

While the invention has been described in detail, the foregoing description is in all aspects illustrative and not restrictive. It is understood that numerous other modifications and variations can be devised without departing from the scope of the invention.

What is claimed is:

1. A method for selecting an optimum route between two arbitrary points on map data, said method comprising:

setting the two points to be searched for on the map data; and searching for the optimum route between the set two points based on the map data;

wherein the map data includes at least node data indicating intersections on a map as nodes and link data indicating roads on the map as links;

wherein the map data represents an area where composite intersection traffic regulation over a plurality of intersections exists by a road network composed of separate node data obtained by separating each intersection on the map into a plurality of nodes and separate link data obtained by separating each road on the map into a plurality of links; and wherein the map data further represents the composite intersection traffic regulation by setting one-way traffic regulations to the separate link data and/or setting right/left-turn traffic regulations to the separate node data.

2. A method for selecting an optimum route between two arbitrary points on map data, said method comprising:

setting the two points to be searched for on the map data; and searching for the optimum route between the set two points based on the map data;

wherein the map data includes at least node data indicating intersections on a map as nodes and link data indicating roads on the map as links;

wherein the map data represents an area where composite intersection traffic regulation over a plurality of intersections exists by a road network composed of separate node data obtained by separating each intersection on the map into a plurality of nodes, separate link data obtained by separating each road on the map into a plurality of links, and unified link data obtained by unifying part of the separate link data; and wherein the map data further represents the composite intersection traffic regulation by setting one-way traffic regulations to the separate link data and the unified link data and/or setting right/left-turn traffic regulations to the separate node data.

3. A method for selecting an optimum route between two arbitrary points on map data, said method comprising:

setting the two points to be searched for on the map data; and searching for the optimum route between the set two points based on the map data;

wherein the map data includes at least node data indicating intersections on a map as nodes and link data indicating roads on the map as links;

wherein the map data represents an area where composite intersection traffic regulation over a plurality of intersections exists by a road network composed of separate node data obtained by separating each intersection on the map into a plurality of nodes, separate link data obtained by separating each road on the map into a plurality of links, and virtual link data obtained by connecting nodes separated from one intersection by a virtual link; and wherein the map data further represents the composite intersection traffic regulation by setting one-way traffic regulations to the separate link data and the virtual link data and/or setting right/left-turn traffic regulations to the separate node data.

4. A method for selecting an optimum route between two arbitrary points on map data, said method comprising:

setting the two points to be searched for on the map data; and searching for the optimum route between the set two points based on the map data;

wherein the map data includes at least node data indicating intersections on a map as nodes, link data indicating roads on the map as links, and composite intersection traffic regulation information indicating composite intersection traffic regulation over a plurality of intersection; and wherein said searching for the optimum route, at the time of searching for the optimum route, also judges whether it is possible to pass through to a next point from the composite intersection traffic regulation information and arrival route information to a point to be searched for, and terminating a search to the next point if it is impossible.

5. A method as claimed in claim 4, wherein the map data records link information to be recorded as the composite intersection traffic regulation information with connection numbers of the links connecting to one node.

6. A method as claimed in claim 4, wherein the map data doubly records the composite intersection traffic regulation information having the same contents in a node or link on an entering side and in a node or link on an exit side, and wherein said searching for the optimum route performs search processing from both of the two points set for a search on the map data.

7. A method as claimed in claim 4, wherein a plurality of kinds of the composite intersection traffic regulation are previously expressed in patterns and different identifiers are set thereto respectively, and the map data records the composite intersection traffic regulation information of said composite intersection traffic regulation expressed in patterns with the identifiers.

8. An apparatus for selecting an optimum route between two arbitrary points on map data, said apparatus comprising:

a map data storage portion for storing the map data;

a point setting portion for setting the two points to be searched for on the map data stored in said map data storage portion; and a route searching portion for searching for the optimum route between the two points set by said point setting portion based on the map data stored in said map data storage portion;

wherein the map data includes at least node data indicating intersections on a map as nodes and link data indicating roads on the map as links;

wherein the map data represents an area where composite intersection traffic regulation over a plurality of intersections exists by a road network composed of separate node data obtained by separating each intersection on the map into a plurality of nodes and separate link data obtained by separating each road on the map into a plurality of links; and wherein the map data further represents the composite intersection traffic regulation by setting one-way traffic regulations to the separate link data and/or setting right/left-turn traffic regulations to the separate node data.

9. An apparatus for selecting an optimum route between two arbitrary points on map data, said apparatus comprising:

a map data storage portion for storing the map data;

a point setting portion for setting the two points to be searched for on the map data stored in said map data storage portion; and a route searching portion for searching for the optimum route between the two points set by said point setting portion based on the map data stored in said map data storage portion;

wherein the map data includes at least node data indicating intersections on a map as nodes and link data indicating roads on the map as links;

wherein the map data represents an area where composite intersection traffic regulation over a plurality of intersections exists by a road network composed of separate node data obtained by separating each intersection on the map into a plurality of nodes, separate link data obtained by separating each road on the map into a plurality of links, and unified link data obtained by unifying part of the separate link data; and wherein the map data further represents the composite intersection traffic regulation by setting one-way traffic regulations to the separate link data and the unified link data and/or setting right/left-turn traffic regulations to the separate node data.

10. An apparatus for selecting an optimum route between two arbitrary points on map data, said apparatus comprising:

a map data storage portion for storing the map data;

a point setting portion for setting the two points to be searched for on the map data stored in said map data storage portion; and a route searching portion for searching for the optimum route between the two points set by said point setting portion based on the map data stored in said map data storage portion;

wherein the map data includes at least node data indicating intersections on a map as nodes and link data indicating roads on the map as links;

wherein the map data represents an area where composite intersection traffic regulation over a plurality of intersections exists by a road network composed of separate node data obtained by separating each intersection on the map into a plurality of nodes, separate link data obtained by separating each road on the map into a plurality of links, and virtual link data obtained by connecting nodes separated from one intersection by a virtual link; and wherein the map data further represents the composite intersection traffic regulation by setting one-way traffic regulations to the separate link data and the virtual link data and/or setting right/left-turn traffic regulations to the separate node data.

11. An apparatus for selecting an optimum route between two arbitrary points on map data, said apparatus comprising:

a map data storage portion for storing the map data including at least node data indicating intersections on a map as nodes, link data indicating roads on the map as links, and composite intersection traffic regulation information indicating composite intersection traffic regulation over a plurality of intersection;

a point setting portion for setting the two points to be searched for on the map data stored in said map data storage portion; and a route searching portion for searching for the optimum route between the two points set by said point setting portion based on the map data stored in said map data storage portion;

wherein said route searching portion, at the time of searching for the optimum route, judges whether it is possible to pass through to a next point from the composite intersection traffic regulation information and arrival route information to a point to be searched for, and terminates a search to the next point if it is impossible.

12. A recording medium for recording map data for use in a route search, wherein:

said map data includes at least node data indicating intersections on a map as nodes and link data indicating roads on the map as links;

said map data represents an area where composite intersection traffic regulation over a plurality of intersections exists by a road network composed of separate node data obtained by separating each intersection on the map into a plurality of nodes and separate link data obtained by separating each road on the map into a plurality of links; and wherein the map data further represents the composite intersection traffic regulation by setting one-way traffic regulations to the separate link data and/or setting right/left-turn traffic regulations to the separate node data.

13. A recording medium for recording map data for use in a route search, wherein:

said map data includes at least node data indicating intersections on a map as nodes and link data indicating roads on the map as links;

said map data represents an area where composite intersection traffic regulation over a plurality of intersections exists by a road network composed of separate node data obtained by separating each intersection on the map into a plurality of nodes, separate link data obtained by separating each road on the map into a plurality of links, and unified link data obtained by unifying part of the separate link data; and said map data further represents the composite intersection traffic regulation by setting one-way traffic regulations to the separate link data and the unified link data and/or setting right/left-turn traffic regulations to the separate node data.

14. A recording medium for recording map data for use in a route search, wherein:

said map data includes at least node data indicating intersections on a map as nodes and link data indicating roads on the map as links;

said map data represents an area where composite intersection traffic regulation over a plurality of intersections exists by a road network composed of separate node data obtained by separating each intersection on the map into a plurality of nodes, separate link data obtained by separating each road on the map into a plurality of links, and virtual link data obtained by connecting nodes separated from one intersection by a virtual link; and said map data further represents the composite intersection traffic regulation by setting one-way traffic regulations to the separate link data and the virtual link data and/or setting right/left-turn traffic regulations to the separate node data.

15. A recording medium for recording map data for use in a route search, wherein:

said map data includes at least node data indicating intersections on a map as nodes, link data indicating roads on the map as links, and composite intersection traffic regulation information indicating composite intersection traffic regulation over a plurality of intersection; and said map data records link information to be recorded as the composite intersection traffic regulation information with connection numbers of the links connecting to one node.

16. A recording medium for recording map data for use in a route search, wherein:

said map data includes at least node data indicating intersections on a map as nodes, link data indicating roads on the map as links, and composite intersection traffic regulation information indicating composite intersection traffic regulation over a plurality of intersection; and said map data doubly records the composite intersection traffic regulation information having the same contents in a node or link on an entering side and in a node or link on an exit side.

17. A recording medium for recording map data for use in a route search, wherein:

said map data includes at least node data indicating intersections on a map as nodes, link data indicating roads on the map as links, and composite intersection traffic regulation information indicating composite intersection traffic regulation over a plurality of intersections;

a plurality of kinds of the composite intersection traffic regulation are previously expressed in patterns and different identifiers being set thereto respectively; and said map data records the composite intersection traffic regulation information of said composite intersection traffic regulation expressed in patterns with the identifiers.

18. A method for selecting an optimum route between two arbitrary points on map data, said method comprising:

setting the two points to be searched for on the map data; and searching for the optimum route between the set two points based on the map data;

wherein the map data includes at least node data indicating intersections on a map as nodes rod link data indicating roads on the map as links;

wherein the map data represents an area where composite intersection traffic regulation over a plurality of intersections exists by replacing the node data or the link data composing an actual road network with a more complicated virtual road network to which information of new links or nodes are added; and wherein the map data further represents the composite intersection traffic regulation by setting one-way traffic regulations to the link data and/or setting right/left-turn traffic regulations to the node data.

19. An apparatus for selecting an optimum route between two arbitrary points on map data, said apparatus comprising:

a map data storage portion for storing the map data;

a point setting portion for setting the two points to be searched for on the map data stored in said map data storage portion; and a route searching portion for searching for the optimum route between the two points set by said point setting portion based on the map data stored in said map data storage portion;

wherein the map data includes at least node data indicating intersections on a map as nodes and link data indicating roads on the map as links;

wherein the map data represents an area where composite intersection traffic regulation over a plurality of intersections exists by replacing the node data or the link data composing an actual road network with a more complicated virtual road network to which information of new links or nodes are added; and wherein the map data further represents the composite intersection traffic regulation by setting one-way traffic regulations to the link data and/or setting right/left-turn traffic regulations to the node data.

20. A recording medium for recording map data for use in a route search, wherein:

said map data includes at least node data indicating intersections on a map as nodes and link data indicating roads on the map as links;

wherein the map data represents an area where composite intersection traffic regulation over a plurality of intersections exists by replacing the node data or the link data composing an actual road network with a more complicated virtual road network to which information of new links or nodes are added; and wherein the map data further represents the composite intersection traffic regulation by setting one-way traffic regulations to the separate link data and/or setting right/left-turn traffic regulations to the separate node data.

* * * * *